(12) United States Patent
Franklin

(10) Patent No.: US 12,097,671 B2
(45) Date of Patent: Sep. 24, 2024

(54) TIRE INFLATION AND SEALING SYSTEM

(71) Applicant: Amitai Aharon Franklin, Tel-Aviv (IL)

(72) Inventor: Amitai Aharon Franklin, Tel-Aviv (IL)

( * ) Notice: Subject to any disclaimer, the term of this patent is extended or adjusted under 35 U.S.C. 154(b) by 569 days.

(21) Appl. No.: 15/127,032

(22) PCT Filed: Mar. 26, 2015

(86) PCT No.: PCT/IL2015/050322
§ 371 (c)(1),
(2) Date: Sep. 19, 2016

(87) PCT Pub. No.: WO2015/145443
PCT Pub. Date: Oct. 1, 2015

(65) Prior Publication Data
US 2018/0029318 A1    Feb. 1, 2018

Related U.S. Application Data

(60) Provisional application No. 61/972,085, filed on Mar. 28, 2014.

(51) Int. Cl.
B29C 73/16 (2006.01)
B29D 30/06 (2006.01)
(Continued)

(52) U.S. Cl.
CPC .......... B29C 73/163 (2013.01); B29C 73/166 (2013.01); B29D 30/0685 (2013.01);
(Continued)

(58) Field of Classification Search
CPC . B29C 73/163; B29C 73/166; B29D 30/0685; B29D 2030/0698; B29L 2030/00; B60C 29/062
(Continued)

(56) References Cited

U.S. PATENT DOCUMENTS 5,070,917 A * 12/1991 Ferris .................... B29C 73/166
141/38
5,403,417 A    4/1995 Dudley et al.
(Continued)

FOREIGN PATENT DOCUMENTS

DE    102004048002    10/2005
DE    102005024560    11/2006
(Continued)

OTHER PUBLICATIONS https://www.engineeringtoolbox.com/reynolds-number-d_237.html (Year: 2003).*
(Continued)

*Primary Examiner* — Timothy L Maust
*Assistant Examiner* — Christopher M Afful

(57) ABSTRACT

A device for inflating and sealing an inflatable object comprising an air-tight tube, at least one hermetic connector reversibly coupled to either end or both ends of said air-tight tube and a source of pressure connected to either one end, second end or said at least one hermetic connector. The airtight tube serves as both storage means and transfer means for a sealing agent. The device allows transfer of said sealant agent in a largely laminar flow, aiding solid and semi-solid materials in said sealant agent to align in the direction of said flow and pass securely throw the valve mechanism without clogging. The inflatable object may be inflated and sealed without removal of the valve mechanism of said inflatable object and may be charged with pressurized gas and sealant agent contemporaneously.

8 Claims, 27 Drawing Sheets

(51) Int. Cl.
 B29L 30/00 (2006.01)
 B60C 17/00 (2006.01)
(52) U.S. Cl.
 CPC ... *B29D 2030/0698* (2013.01); *B29L 2030/00* (2013.01); *B60C 17/00* (2013.01)
(58) Field of Classification Search
 USPC .......................................................... 141/38
 See application file for complete search history.

(56) References Cited

U.S. PATENT DOCUMENTS

| | | | |
|---|---|---|---|
| 5,908,145 A | 6/1999 | Jaksa | |
| 6,345,650 B1 | 2/2002 | Paasch et al. | |
| 2011/0011217 A1* | 1/2011 | Kojima | ................ B29C 73/166 81/15.2 |

FOREIGN PATENT DOCUMENTS

| | | | | |
|---|---|---|---|---|
| GB | 2482016 A | * | 1/2012 | ........... B29C 73/166 |
| WO | WO 2015/145443 | | 10/2015 | |

OTHER PUBLICATIONS

International Preliminary Report on Patentability dated Oct. 4, 2016 From the International Bureau of WIPO Re. Application No. PCT/IL2015/050322. (6 Pages).

International Search Report and the Written Opinion dated Aug. 6, 2015 From the International Searching Authority Re. Application No. PCT/IL2015/050322. (8 Pages).

Supplementary European Search Report and the European Search Opinion dated Jan. 18, 2018 From the European Patent Office Re. Application No. 15768828.4. (9 Pages).

* cited by examiner

TIRE INFLATION AND SEALING SYSTEM

FIELD OF THE INVENTION

A device for inflating and filling pneumatic tires with sealants for repairing and preventing punctures.

BACKGROUND OF THE INVENTION

There are over one billion cyclists in the world today, and many additional transportation methods incorporate inflatable pneumatic tires. A flat tire is always a risk and the repair is inconvenient and generally time consuming. As of now, there is no simple solution enabling one to permanently fix a flat tire and continue one's journey in a matter of a few minutes.

At a minimum, current permanent repair solutions require the user to disassemble and reassemble the pneumatic tire valve core. However, in most cases, there is a need to disassemble and reassemble the entire tire and, in addition, most of the existing solutions require the user to locate the puncture. Hence, these procedures require a fair amount of technical skill, tools and are time consuming.

Currently there are two simple and fast tire repair options, however they can only produce a temporary repair of a puncture. One option is injection of 'Sealing Foam' that normally comes in compressed aerosol canisters and is applied through the tire valve stem. This Sealant seals a puncture by polymerizing into foam that fills the pneumatic tire cavity. This type of sealant has the advantage of being easily deployed, but has the downside of only providing a short-term repair that will render the tire useless within a few hours of use. A major disadvantage of this sealant category is that it contains chemicals hazardous to humans and the environment and holds inferior sealing properties. Finally, this method exerts an environmental impact by using a disposable metal canister, toxic and hazards sealing agents, and adding the fact that one will still need to replace the tire within a matter of hours of use. This is therefore the least eco-friendly solution on the market today.

The second option is using a tire mobility kit that temporarily fixes a flat tire. The sealants used are mostly latex based, low in fiber content, and contain not very reactive polymers. Due to the last two reasons, many times this type of repair kits will fail in sealing the puncture. The benefit of this solution is the valve-through sealant technology, which provides a simple to use repair method.

U.S. Pat. No. 5,403,417 "Tire sealing methods and related apparatus" is an example of a related patent, which discloses a method for sealing and inflating a punctured pneumatic automotive tire using a specially designed sealant canister containing gas propellant and a canister containing a Sealant Foam mixture.

FIG. 1 depicts the use of the system for filling and repairing flat tires with Sealing Foam as referred to above. Here a canister 16 is used to fill a tire 10 with air pressure and expanding Sealing Foam.

This Sealing Foam delivery device can be operated with an inflation valve core 14 left in place, allowing insertion of sealing agents and the simultaneous filling of pressure. Although this provides an immediate and easy fix to the problem, it does not provide a permanent or long lasting solution due to the quick degradation of the mechanical properties of the sealant, and it cannot insert securely sealants from the Sealant Slime family (see definition section below).

U.S. Pat. No. 5,908,145 "Pneumatic tire sealant dispenser" discloses a housing designed to enclose a given amount of tire sealing fluid, coupled with a flexible hose at its output port with a pneumatic tire valve, and charged at its input port from a source of compressed air to inject the tire sealing fluid through the pneumatic valve.

This protects the tire against later blowouts or puncturing when in use. The simultaneous tire inflation and insertion of puncture sealant factors remains undisclosed. The aforementioned device is capable only of insertion of sealant liquid without re-inflating capabilities. The device must be connected in a certain order, first connecting the tire to be inflated and then connecting the high-pressure source. Failing to follow the precise steps will cause failure in procedure completion.

Furthermore, the flow in the device does not behave like Laminar flow (with a low Reynolds number), and will induce turbulent flow of the sealant as the device is structured with abrupt changes in the flow cross section. This structure results in chaotic fiber orientation and the rising of the accumulated energy within the tire sealant that creates a tendency of premature polymerization if the inflation valve core is in place. This creates a limitation—the need to remove the valve mechanism from the valve stem when inserting sealant slime sealants (see definition section below). Furthermore, the method of insertion of sealant agent cannot be done while gas pressure is present in the tire, as for the moment the device is disconnected the pressure will escape. FIG. 2 is illustrating a device for filling a punctured tire with sealants. Here the valve core 16 must be removed for insertion of sealant slime sealing agents as is clearly stated in the figure. Additionally this device is not easily portable since the fluid contained in the volume 12 can easily escape if the device is transported in a shaking or vibration-prone environment such as a bicycle, allowing the fluid to drip out of connector 44 and/or 22.

U.S. Pat. No. 6,345,650 "Tire repair device and method" discloses a repair device and method comprising a canister having an internal cavity, an input connecting valve, an output connecting valve, an input hose for transfer of air from an inflated tire, and an output hose for the purposes of transmission of liquids to a pneumatic device such as a flat tire. The device serves as a path linking an inflated donor tire through a canister to a deflated tire. A sealing agent is stored in the internal cavity of the canister for injection. When linked correctly high air pressure from an inflated tire propels the tire sealant agent into a designated tire, thus providing puncture repair and the prevention of future leaks. However, the device must be connected and disconnected in a sequence of predetermined steps, demanding a reasonable degree of technical understanding. If the procedure is carried out not in the right order, a critical error will occur where the donor tire will undergo a great loss of air pressure and will not be in a drivable condition anymore. Secondly, the process of inserting Sealant slime sealing agents through the valve while the valve core is in place-will cause a blockage of the valve or the blockage of the injection device due to fiber entanglement or premature polymerization of the sealant in the boundary between the canister 10 and the entrance of the sealant delivery hose 20. On a practical level, this device requires that the valve core is removed prior to insertion of sealant agent, and then reinstalled prior to inflating the flat tire. This is time consuming and requires greater technical skill in order to complete the insertion of sealant slime and inflation of tire, and will not allow a secure simultaneous filling with sealant agent and gas pressure.

FIG. 3 of prior art shows a system for inflating a flat tire using pressure from a full tire to force a fluid in canister 10 through hose 20 and into tire 40. The hose 30 must be connected to the full tire 42 and host 20 must be connected to the flat tire 40; a reverse connection will not propel the sealing agent up the canister and into the tire 40, but rather inflate un-expendable air into a leaking tire without any or with very little sealing agent.

Finally, connection of hose 20 to valve 22 must be made before connection of hose 30 to valve 32. Otherwise, the fluid of canister 10 will flow out the hose 20 before it is connected and if not stopped in time will rapidly release air pressure from 42 inflated tires and will add another deflated tire to the situation to be solved.

All prior art that allows for injection of sealants and inflation of air pressure into pneumatic tires have not taken into account the effect of abrupt changes in cross section flow diameter and do not take into consideration fiber alignment and maintaining the energy level of the sealant low. Due to Bernoulli Effect and sealant slime characteristics, rapid changes in flow path cross-section will introduce high-pressure points that exceed critical pressure levels when propelled with gas from a high-pressure source such as a compressed gas canister. When these forces pass critical levels, sealant slime of latex and other reactive base sealants will polymerize instantly and thereby clog the apparatus or valve core mechanism.

SUMMARY OF THE INVENTION

In this document, we describe a novel approach for producing devices for insertion of tire sealants (from the Sealant Slime family) that are low cost, portable, user-friendly, foolproof, that provides the ability to, reliably and securely, inject Sealants Slime sealing agents, in a simple, clean, eco-friendly manner into pneumatic devices and inflate the tire successively.

An objective of the present invention is to provide a device for inflating and sealing an inflatable object, and in particular pneumatic tires, comprising: an air-tight tube having a first end and a second end; at least one hermetic connector operatively connectable to the valve of the inflatable object, reversibly coupled to either the first end, the second end or both ends of the air-tight tube; a source of pressure connected to either the first end or second end of the air-tight tube; further where the device comprises a substantially constant cross section throughout the flow path with no abrupt changes in diameter or treacherous pathways and an inner diameter of at least one end of the tube having approximately the inner diameter of the inflation valve of the inflatable object, thereby allowing transfer of the sealant agent in a laminar flow, and inducing fibers and other solid and semi-solid materials in the sealant agent to align in the direction of the flow and pass securely through the valve core without clogging of the valve core or the injection device; further where the inflatable object may be inflated and sealed without removal of the valve core of the inflatable object; and further where the inflatable object then may be charged with pressurized gas and sealant agent successively.

The first mechanism, novel in this patent over prior art, that plays a key role in enabling sealant slime sealing agents with high fiber content to pass securely through the valve core without clogging of the valve core or of the injection device is the novel "Flow Tube" which creates together with the hermetic connector a close to constant cross section flow path, with no abrupt changes in diameter, or treacherous pathways and obstacles to the flow, and which is narrow (normally 4-8 mm). These factors combined induce fiber and particle alignment in the tire sealant due to laminar flow and the velocity profile of the sealant layers. When the flow is laminar for a sufficiently long section, in a tube that has an inner diameter of 2.5-10 mm, fiber alignment occurs. This is triggered by friction of the hermetic tube walls. The friction from the walls creates excess drag around the boundary layers of the sealant. This slows the layer flow speed, which in return slows the layer flowing beneath, and this repeats itself in a decreasing magnitude until it reaches the center line of the flow. When this is maintained with no interruption, polymers, fibers and other solid particles align with the direction of the flow (this type of phenomena is identical to the phenomena created during the injection molding process, further demonstrated in this link example: https://bit.ly/2YT5yAZ).

A second mechanism that plays a key role in enabling latex (and other reactive based polymers) sealant slime to pass securely through an inflation valve core without clogging of the valve core or the injection device is keeping the flow path with no abrupt changes in the inner diameter of the flow tube and hermetic connectors. As speed, pressure, and diameter size are linked, keeping a constant cross section will eliminate high pressure points that trigger premature polymerization. Furthermore, laminar flow holds a lower energy level then turbulent flow, allowing for more reactive sealants to be safely used, and injected through the tire inflation valve.

A further objective of the present invention is to provide a device where the cross section varies gradually, with the inner diameter of at least one end of the tube having approximately the inner diameter of the inflatable object's valve.

A further objective of the present invention is to provide a device where the device is adapted to transfer the sealing agent in the absence of the valve mechanism of the inflatable object.

Another objective of the present invention is to provide a device where at least one end of the device is provided with the hermetic connector while the other end is closed, whereby the sealing agent may be transferred into the tire by means of applying mechanical pressure to the tube.

Another objective of the present invention is to provide a device where the flow tube enables alignment of the elements in the direction of the laminar flow thereby avoiding the elements from being stuck, tangled or clogged in the hermetic connector and the inflatable object's valve mechanism.

Another objective of the present invention is to provide a device further providing a canister of compressed gas adapted to charge the inflatable object with the compressed.

Another objective of the present invention is to provide a device where the hermetic connectors comprise of check valves, thereby maintaining a hermetically sealed cavity for the sealant agent when the device is transported, thereby allowing the device to be portable and leak proof.

Another objective of the present invention is to provide a device where the hermetic connectors are adapted to simultaneously open valves on the inflatable object and open the non-return valves, whereby the source of pressure and the sealant agent are in fluidly communication with the inflatable object.

Another objective of the present invention is to provide a device where the source of pressure is selected from a group consisting of: a pressurized object, a vehicle spare tire, a mechanical pump, a hand pump, a foot pump, a cartridge of compressed gas, mechanical force, human physical force, a squeezing device, and any combination thereof.

Another objective of the present invention is to provide a device where the flow inside of the device is characterized by Reynolds number below the critical value 2300.

Another objective of the present invention is to provide a device where the hermetic connector opens the valve's pin the maximum length enabled by the manufacture of the valve.

Another objective of the present invention is to provide a device where the hermetic connector is characterized by a one-way valve comprising a spring, the spring further characterized to avoid opening of the one-way valve when pressure from the source of pressure is below 24 psi, when the source of pressure is a car tire, which needs to remain in driving condition.

Another objective of the present invention is to provide a device where the device can be a "one-shot" disposable tube, and where the tube comprises a "non-one way" hermetic valve connector.

Another objective of the present invention is to provide a device where the device comprises a gradual flow tube adapted to provide large quantities of the sealant agent.

Another objective of the present invention is to provide a device where the device can be a gradual flow tube device adapted to supply sealant agent in a more compact configuration.

Another objective of the present invention is to provide a device where the device further comprises a pressure-limiting element for linking between hermetic connector and the source of pressure thereby limiting the pressure and lowering critical forces affecting the sealant agent.

Another objective of the present invention is to provide a device where the sealant agent is kept inside the device due to the interconnection of the first end and the second end by means of at least one hermetic connector.

Another objective of the present invention is to provide a delivery device of sealant agent into a pneumatic tire comprising: a tube having one close end and one open end; a hermetic connector on the internal part of the one open end of the tube; where the hermetic connector adapted to fit into the valve of the pneumatic tire by means of female thread configuration.

DETAILED DESCRIPTION OF PREFERRED EMBODIMENTS

Figure 1:
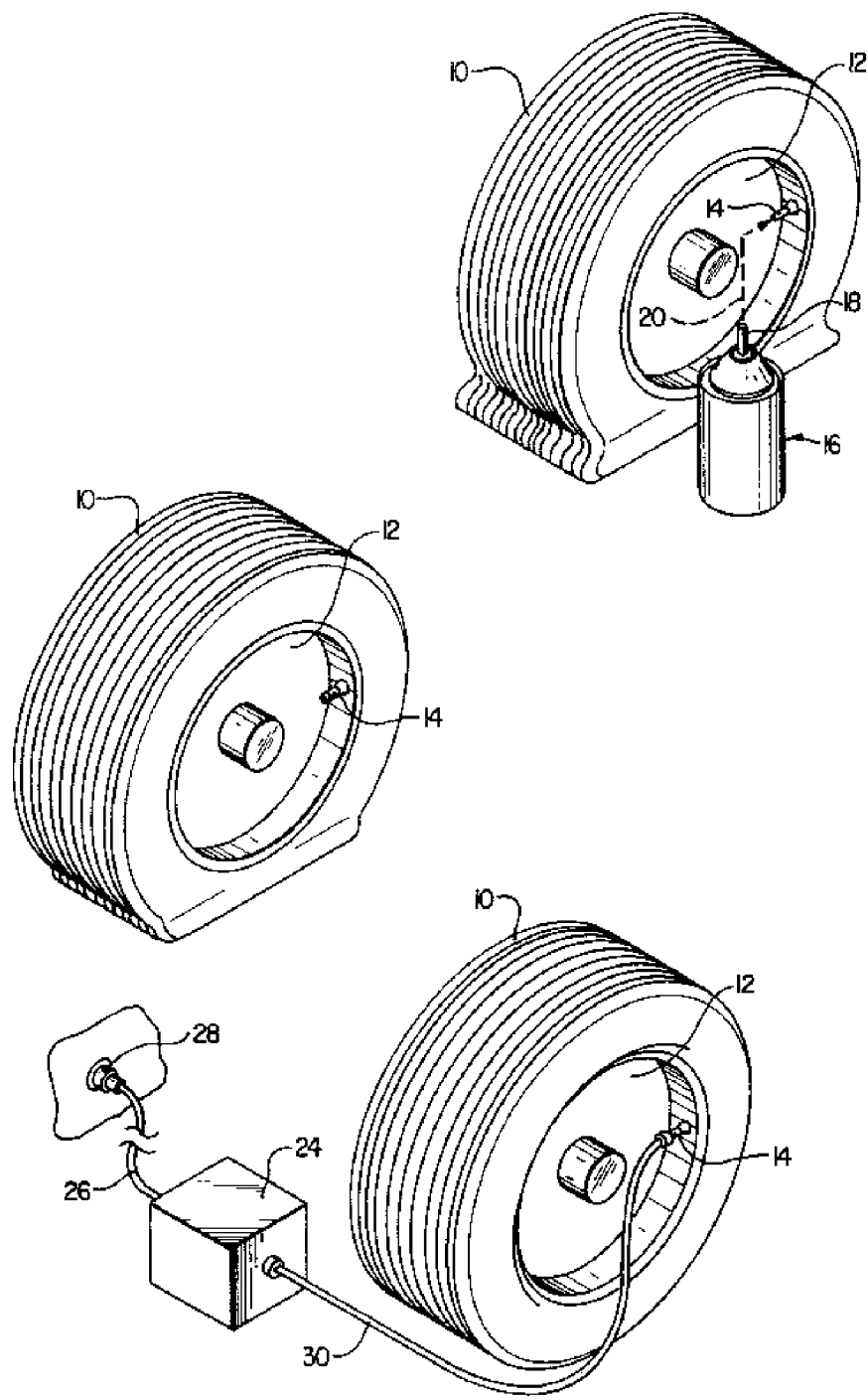
FIG. 1 depicts an inflation and sealing system of prior art.
Figure 2:
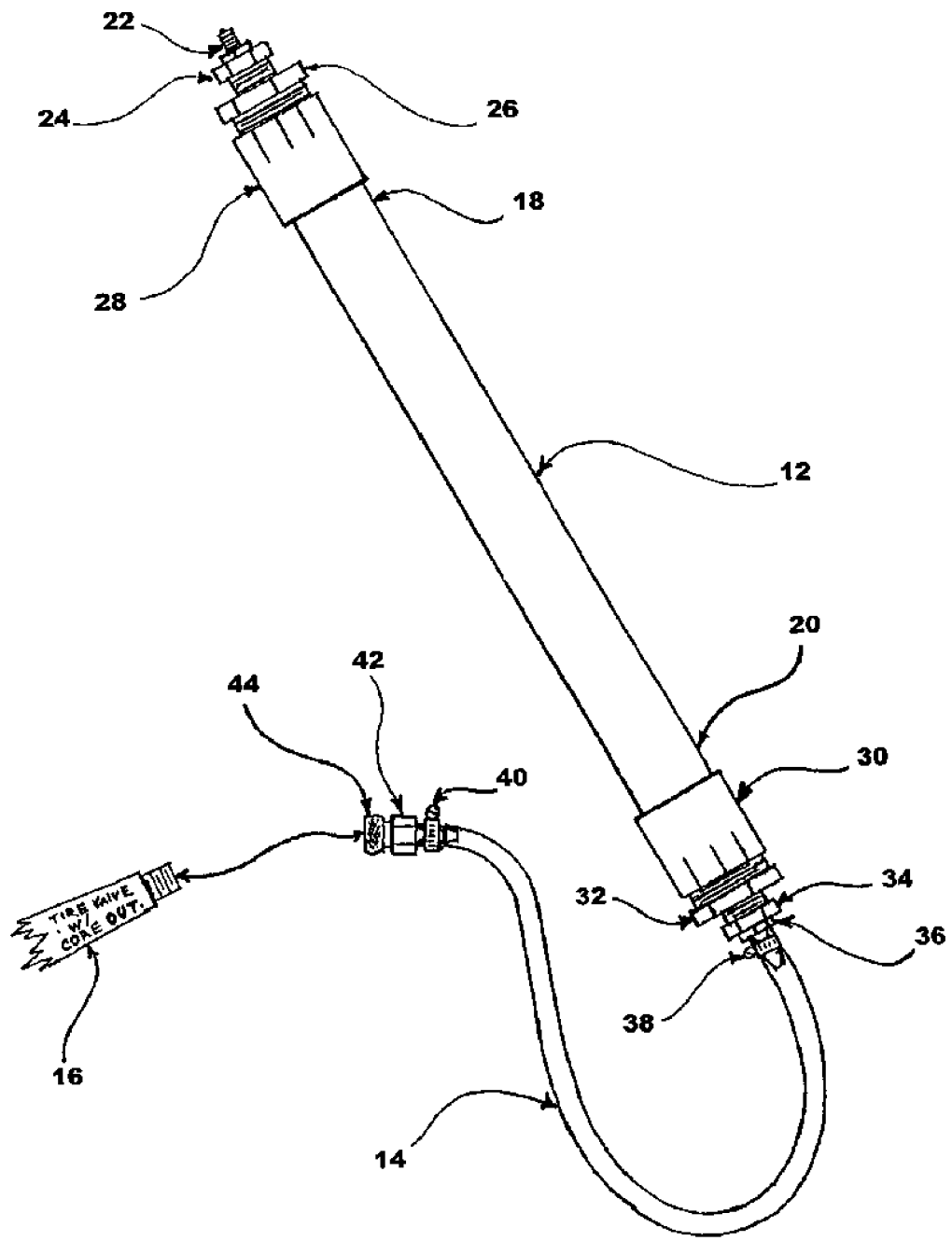
FIG. 2 depicts a sealing system of prior art.

"Flow Tube" hereinafter refers to a flexible tube structure used as a cartridge and as a pathway which holds a near constant cross section flow area, with the inner diameter of at least one end of the tube having approximately the inner diameter of a pneumatic inflation valve.

"Sealant Slime sealing agent" hereinafter refers to a group of tire sealants that are defined as "Sealant Slime" or "Sealant Slime sealing agents" interchangeably. This sealants group has the ability to provide a durable and long-lasting solution for preventing and repairing punctures and are considered to provide a permanent repair as the repair tends to last until the end of the life span of an inflatable tire. These sealants are publicly known by a number of names, one of the more widely accepted generic names go by the name "Slime", which comes from a product line and brand name "Slime™". Manufacturers normally intend the use of these sealing agents as preventative means that are to be inserted into pneumatic tires and inner tubes prior to getting a flat. This is due to an inability to insert these sealants into pneumatic tires through the inflation valve core securely without danger of clogging of the valve core or injection apparatus and the process requiring labor and know-how for removing and installing the inflation valve core. This group of sealing agents, once installed in the tire, form a protective layer inside the tire. When a puncture occurs, the internal pressure of the inflated tire instantly pushes the sealant into the cavity of the puncture. Fibers and other solid particles such as micro mica platelets accumulate and create a mechanical plug. In many cases manufacturers combine the mechanical plugging materials together with polymers such as latex that bond the particles together in the mechanical plug and bond plug to the tire rubber in the cavity. The mechanical plug tends to form through the full depth of the cavity, which delivers a very durable fix, one which outperforms traditional repair methods. There are three common denominators unifying sealing slime sealants:

1. They are manufactured to cure multiple flats as they occur in a pneumatic tire.
2. These sealants are designed to go under local change of the sealant composition or structure when interacting with the hole in a pressurized tire.
3. Under current days injection technology they cannot pass securely through a valve core. In other words, they require valve core removal to be inserted. Various Sealant Slime sealing agents are manufactured using eco-friendly and biodegradable components. The combination of these together with the patent under consideration provides an ideal solution to the problem discussed.

"Sealing foam" hereinafter refers to expanding foam that can be found in aerosol canister tire repair solutions. These sealing agents generally polymerize immediately upon injection immediately after leaving the holding canister. They have very low fiber and solid particles content and have low viscosity. This group of sealants is commonly used for emergency car tire repairs, and to some limited extent has been adopted in the cycling field.

"Hermetic Connector" hereinafter refers to connectors that are gas tight when connected to a valve stem. These Hermetic connectors establish a safe, gas-tight seal, allowing fluid communication between two volumes, such as between a tire to be inflated and a source of pressured air. Use of such connectors prevents leaking that occurs in other common methods of sealant transfer.

"One-shot" hereinafter refers to a single injection mold process. This also includes multi-layer injection molding technology.

"Charge" hereinafter refers to the action of delivering materials, either compressed air or sealant agent, into the inflatable tire.

The term "Setting up" refers herein to supplying sufficient gas pressure and gas flow rates required for adhering tubeless tire walls to the sidewalls of a tire rim.

The term "approximately" refers to 30% to 250% of the described amount.

The present invention allows for a portable device for transferring puncture-sealing liquids and more specifically Sealant Slime sealing agents into pneumatic objects such as bicycle tires, capable of successively inflating the inflatable tire and providing it with self-sealing properties that are capable of creating permanent seals and that are highly durable. In the case of repairing flat in pneumatic tires allowing the tire to seal instantly or after one or more rotations of the wheel. Furthermore, the device described in this document produces the most efficient means known today in permanently fixing flats in pneumatic tires. The invention provides a method for insertion of sealing slime sealing agents into pneumatic tires without the necessity for removing the valve core from the valve stem. This reduces the number of steps needed to complete a repair of a puncture in pneumatic tires. Furthermore, the steps needed are simpler and require much less technical skill than ever before in preventing punctures or permanently repairing existing ones.

The device and its embodiment are designed to be as foolproof as possible, by being either constructed in a way that will only permit for a certain way of connection, or by being constructed in a way that will make connection order and direction of device irrelevant.

The device and method in this document allow for dual function, one of Sealant Slime insertion and the second of inflating the pneumatic tire with sufficient gas pressure for use. The device achieves its technological ability by combining components from the following: "Flow Tube", hermetic valve connector, unique one-way valves, seals, and existing liquid sealant agents from the sealant slime sealing agents group.

All devices in the invention comprise of at least a Flow Tube, and at least one hermetic valve connector. These components will be described in detail in the following descriptions of the different embodiments.

By applying air pressure (or any type of gas or mechanical pressure) through the end of the Flow Tube, which is not connected to the tire, Sealant Slime sealing agent, which is stored in the Flow Tube, will flow into the pneumatic tire via the tire valve stem. If desired the tire can then be further inflated. This is largely possible, due to the novel ability of this invention, to insert securely Sealant Slime sealing agents through the pneumatic tire valve stem while valve core is still in place further allowing gas pressure to accumulate in tire, and not escape the moment the device is disconnected from the valve stem.

The device is normally fitted with hermetic connectors at either end, but in some instances valve connectors will be fitted only on one side. The Sealant Slime can be propelled, and the pneumatic tire inflated by gas, such as carbon dioxide, nitrogen, or compressed air from hand-pumps, electrical-pumps, canisters, and other unique sources such as donor car tires or gas-compressed bottles of soft drinks fitted with a dedicated valves and pressure release mechanisms for safety.

The Flow Tube with the carefully designed hermetic valve connectors provides a near constant cross section flow area, with no abrupt changes in diameter, or treacherous pathways throughout the whole insertion path of the Sealant Slime. This design has a dual purpose. The first, to eliminate risk of premature polymerization of the sealant slime sealing agents in the injection apparatus. This is crucial with sealant slime sealing agents that are based on latex and other similar polymers, as they utilize friction and shear to elevate the energy within the sealant beyond a critical energy level that triggers immediate polymerization of the polymers in the sealant. Providing a near constant cross section with no obstacles for the flow of the sealant slime and no abrupt changes in diameter dramatically aids with maintaining laminar flow, lowers the shear and friction forces acting between the layers of the sealant. The second purpose of keeping a near constant cross section throughout the whole insertion path is to aid with alignment of fiber and other solid particles with the direction of the flow. Doing this allows long fibers that may in some cases be longer than the orifices that construct the inflation valve core to pass securely without clogging of the valve core or the injection apparatus.

In addition to these two key contributions, which are relevant for the large majority of sealing slime sealing agents technologies found in the market today, some manufactures produce sealant slime sealing agents that rely on separation between the polymers and the suspension in order to solidify the polymers. With these type of sealant slime sealing agents keeping the near constant flow area cross-section and avoiding sharp edges will reduce to a minimum the occurrence of separation of polymers from the suspension in the flow path, thus preventing the premature polymerization that may clog the injection apparatus or the inflation valve core.

If, due to various technical reasons, such as a requirement of large holding capacity of Sealant Slime in the device (e.g. one suitable for a car tire) it will not always be practical or preferable to hold a near constant cross section flow area throughout the entire flow-path, the Flow Tube diameter can change gradually in order to achieve the same desired effect and as long as there is a sufficiently long flow path with a near constant cross section to induce fiber alignment.

In one embodiment, the device is shaped as a long tube-like structure containing a sealing agent such as Sealant Slime, with various terminating connectors and shapes as will be described below. Some embodiments, the tube-like, may be coiled into a spiral hose with at least two openings, one at either end of the tube. Multiple openings at each end are also possible, and will provide a more versatile insertion and gas source connection possibilities.

Once connections are established on each end of the Flow Tube, a hermetically sealed configuration is established. Once the configuration is established, a propelling force from the pressure source will transfer Sealing Slime sealing agent into the tire through the inflation valve, while the valve-core is still in place.

The flexible Flow Tube of the present invention can be partially or totally transparent. This enables the user to monitor the status of the sealant inside the tube.

One possible operational downside of the prior art can happen when operating a similar device with a mechanical pump. During the back-strike action of the pump, if the tire valve pin is pressed open, a pathway and presence of backpressure can force unwanted sealant into the pump components. In one embodiment of the present invention, the valve on the Hermetic Connector is constructed with a shortened or missing valve pin thus not permitting the opening of the non returnable valve from said pump mechanism, hence avoiding said operational downside.

Figure 4:
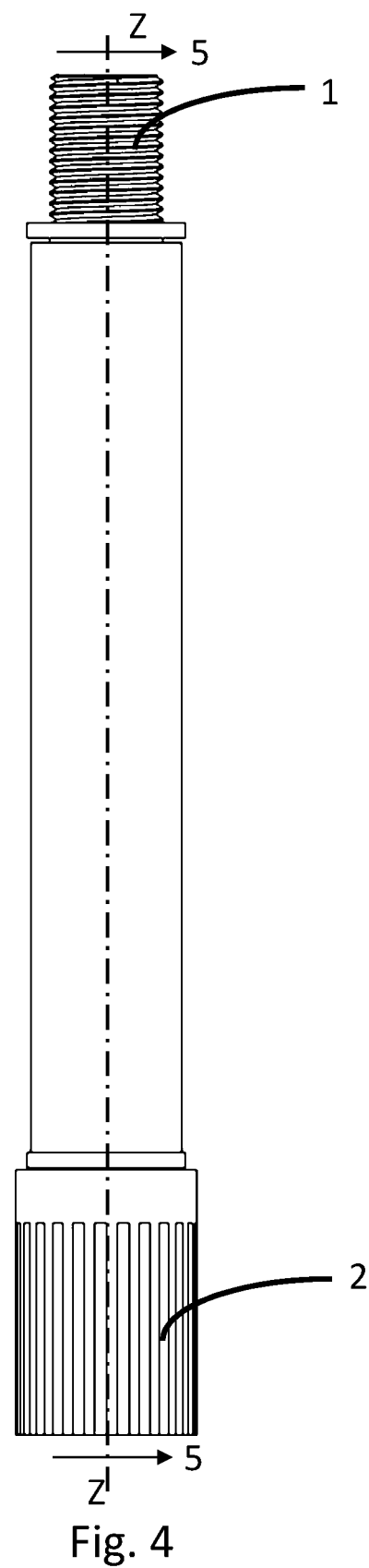
FIG. 4 shows a Flow Tube fitted in volume for road-bike pneumatic tires designed to insert tire sealant and inflate the tire having a female hermetic connector suited for Presta valve type.

Referring now to FIG. 4, showing a small volume flow tube having one valve (hidden) and two hermetic connectors (1 and 2) for road-bikes, which require a small quantity of sealant slime.

Figure 5:
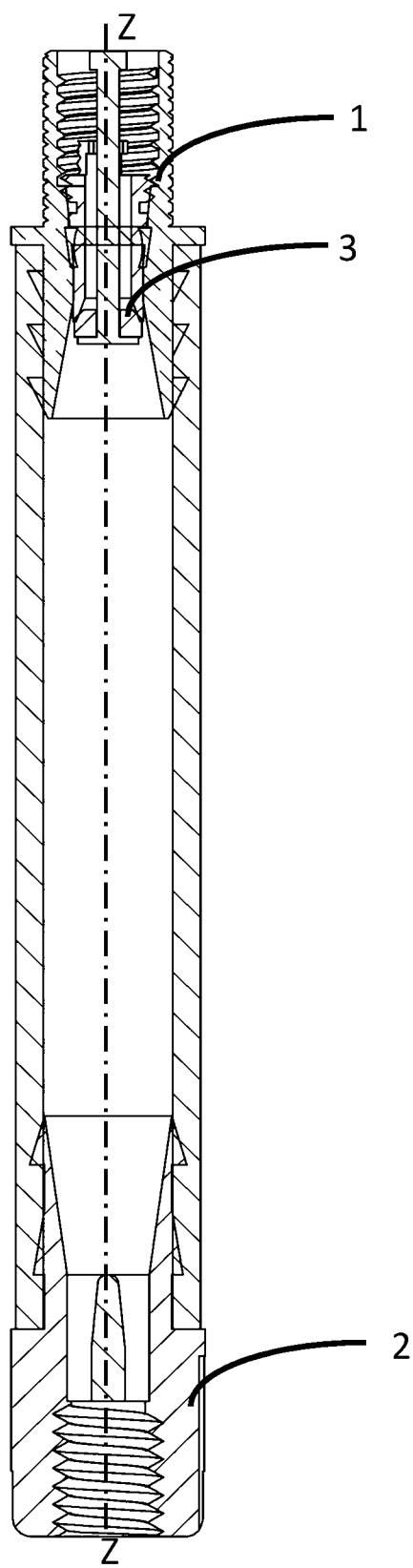
FIG. 5 shows a cross section of FIG. 4.

Referring now to FIG. 5, showing a cross section of FIG. 4. The cross section reveals the valve 3 in addition to hermetic connectors 1, 2.

Figure 6:
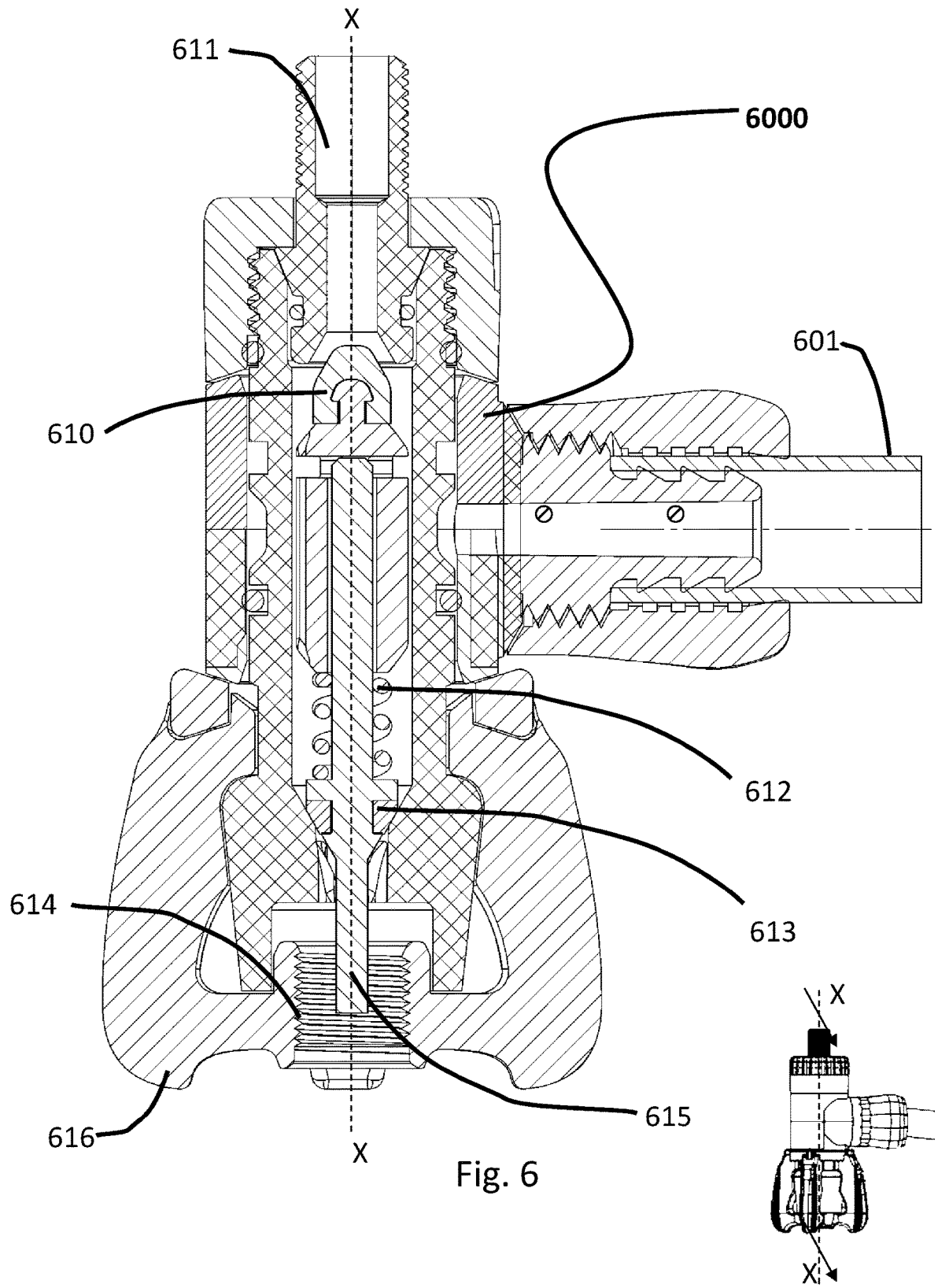
FIG. 6 shows a cross section of a Hermetic connector, which is constructed with dual connection possibilities, female and male, and a spring with two one-way valves.

Referring now to FIG. 6, showing a close up of one embodiment of the present invention, a cross section of the hermetic connector 6000 is disclosed. 611 is a male, check valve stem connector, that can be connected to hand pumps, electrical pumps and other standard sources of gas pressure. 612 is a spring that provides pressure and ensures a close (shut) state of two opposing check valves: 610 and 613. Valve 613 is in shut position, and has a uniquely designed depressing pin 615, which is structured especially to simultaneously press and open a pneumatic tire valve core depressing pin for about 2-3 mm (ideally to depress to the maximum of the allowed travel) and to open the injection device internal valve 613 simultaneously. In this figure, the upper valve 610 is in an open position. As previously described, valve 610 pin needs to be shortened, or as in this case, the pin is completely missing. This design of valve 610 is made in order to eliminate cases of fluid backflow from the device into a pump or other gas pressure source. This missing pin will allow valve 610 to be opened only in situations where high gas pressure is introduced through the male valve stem connector 611. The advantage of having a shorten or missing pin is that a depressing pin, which is normally present in pumps and other gas pressure source connectors, won't be able to mechanically open the valve 610, thus preventing entering of sealing material from tube 601, into the pumping devices. On the bottom side, there is a female valve connector composed of thread 614 and a rotating head 616.

Figure 3:
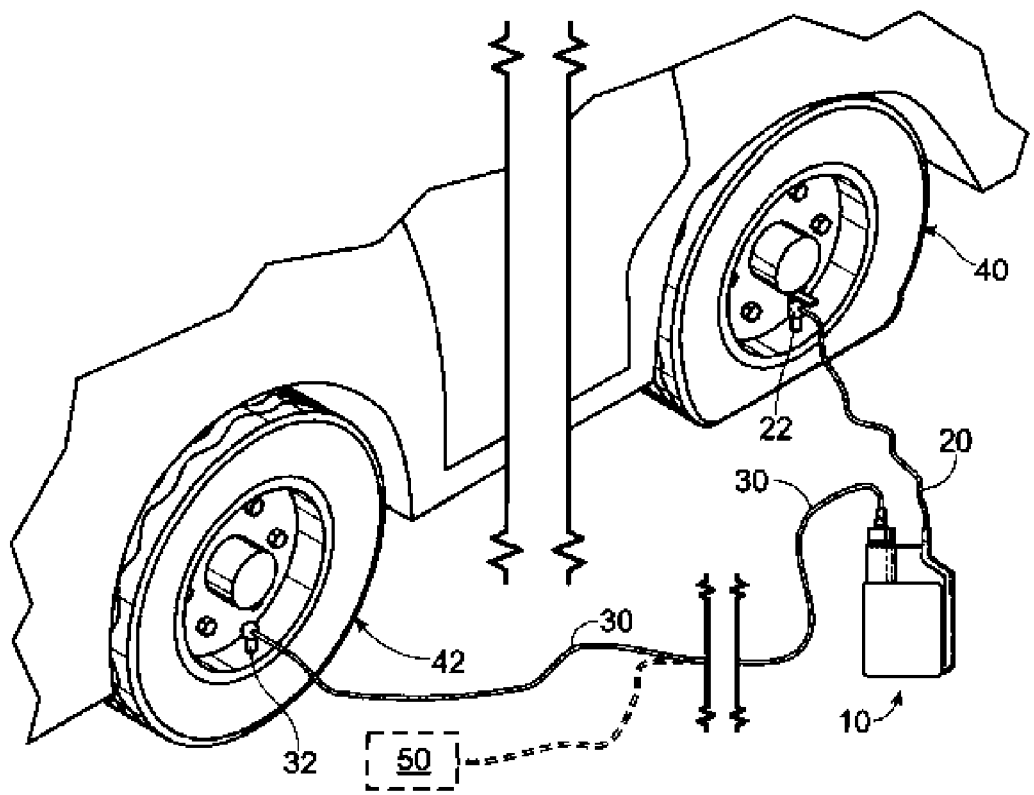
FIG. 3 depicts yet another inflation and sealing system of prior art.
Figure 7:
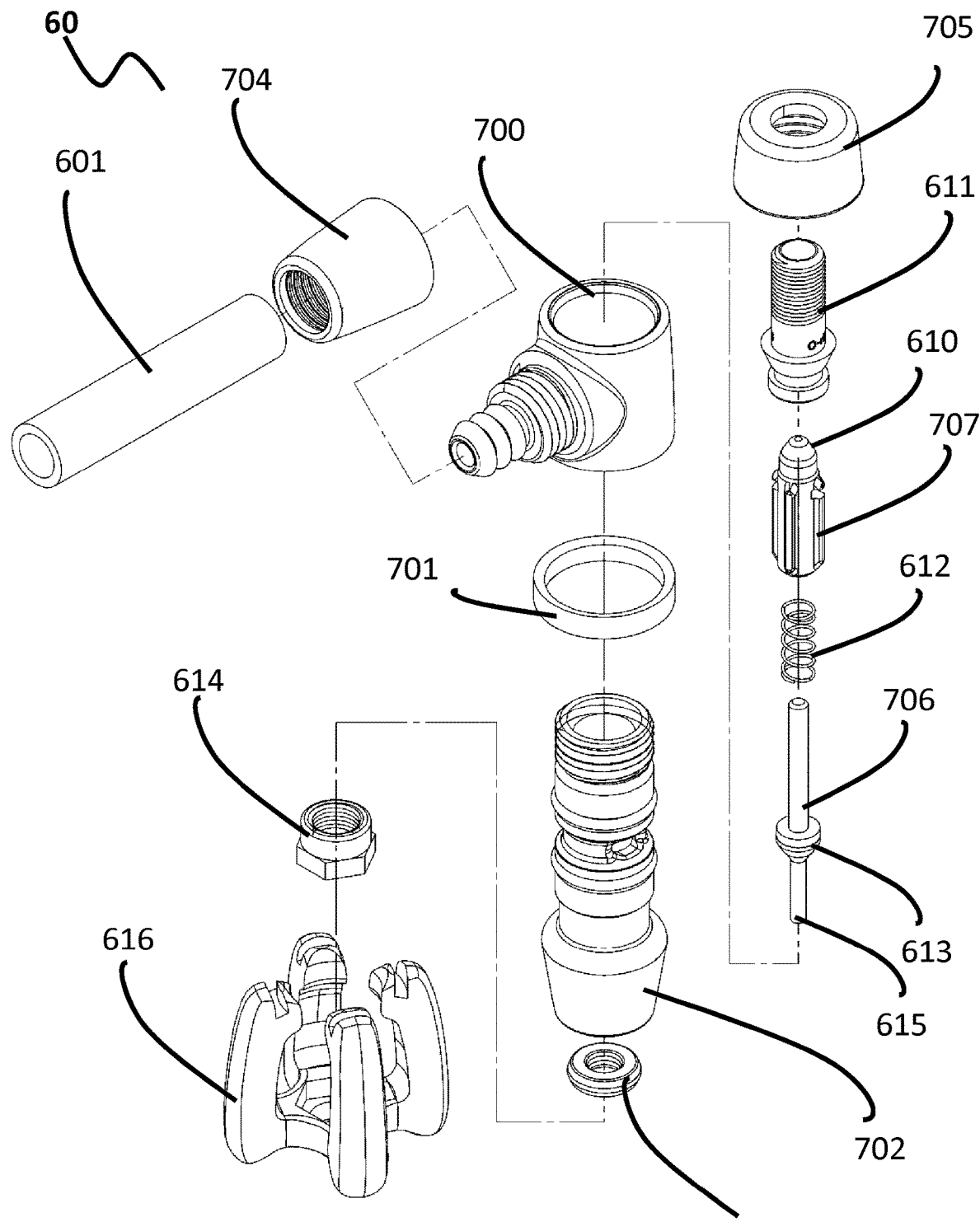
FIG. 7 shows an exploded view of the Hermetic connector from FIG. 6.

Referring now to FIG. 7, a schematic exploded view of the Hermetic connector 6000, showing all of its different parts. 601 is the tube-like part in which the Slime Sealant material is kept. 700 is a connector having a hose, where 601 is inserted. 704 tightens the connection between 601 and 700, preventing them to separate. 702 is the main body of the connector, and is inserted through 701 and 700. 701 helps holding handle 616, which includes thread 614. Between thread 614 and main body 702 there is a sealing ring 703, which ensures proper sealing. Inside the main body 702 there are the valve mechanisms, which comprise the male valve, stem connector 611, on which closer 705 is screwed. Adjacent to 611 is the previously described, missing-pinned valve 610. The body containing 610 is 707. 707 has a hole on which 706 can enter. Inserted around 706 there is the previously mentioned spring 612 that provides pressure and ensures a close (shut) state of two valves: 610 and 613. Also shown is valve 613 which is responsible for preventing the exit of the sealing material until the Hermetic connector is properly connected to the small volume flow tube (FIGS. 3 and 4). Finally, pin 615 is shown. 615 is a uniquely designed depressing pin, structured in length (between 2-3 mm) to simultaneously press and open a pneumatic tire valve pin, and to open the device valve 613 simultaneously. Once the Hermetic connector is assembled, connector 700 is capable of freely rotating on its axis. This feature provides the present invention with a degree of mobility that eases on the flow of sealant, preventing internal turbulence that might cause early polymerization.

Figure 8:
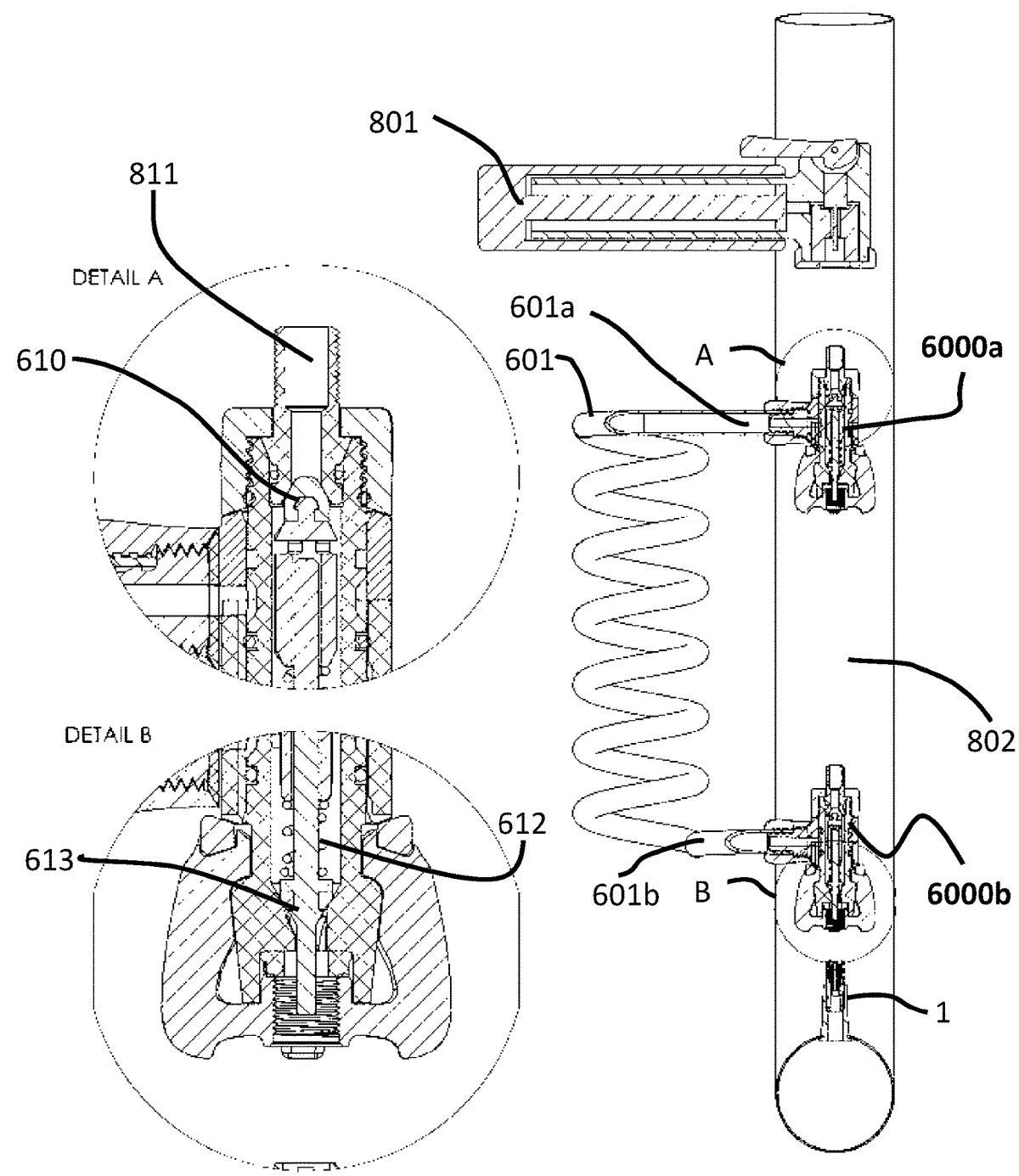
FIG. 8 shows a coiled flow tube connecting from a hand pump to a bicycle tire, in a disconnected position. One can see that the valves in the device are in close position not allowing the sealant concealed in the device to escape to the atmosphere.

Referring now to FIG. 8 showing a coiled flow tube 601, having on one end 601a a hermetic connector 6000a and on a second end 601b a second hermetic connector 6000b, before linking it from one side to a hand pump 801 and to the other a bicycle tire 802, in a disconnected position. It is evident in details A and B that valves 610 and 613 are in a closed position, preventing the sealant contained in the device from escaping to the environment prematurely.

Figure 9:
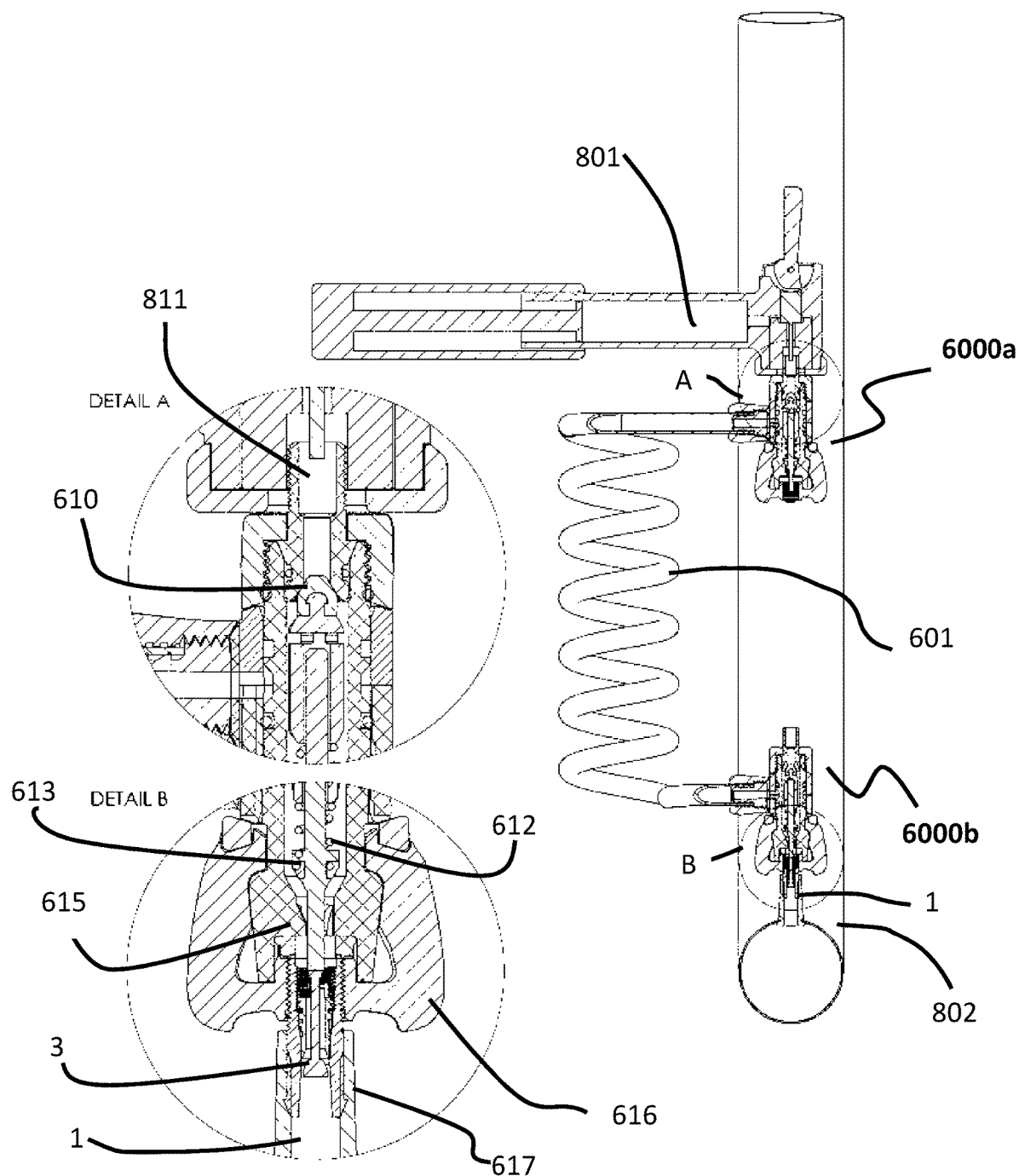
FIG. 9 shows a coiled flow tube connecting from a hand pump to a bicycle tire valve, in a connected position, while the pump is in a backstroke position.

Referring now to FIG. 9 showing a coiled flow tube device connected from one side to a hand pump 801 and from the other to a bicycle tire 802 through a valve 1, in a connected position, while the pump 801 is in a backstroke position. It is evident in details A and B that pin-less valve 610 in the male side 611 of the hermetic connector is kept in shut position due to the spring 612 until high pressure is introduced through the male valve connector 811 from the pump 801 or any other source of gas pressure. The female valve connector is connected to bicycle valve 617. Due to the uniquely designed pin 615 the valve core 3 is pressed open, simultaneously with the device valve 613.

Figure 10:
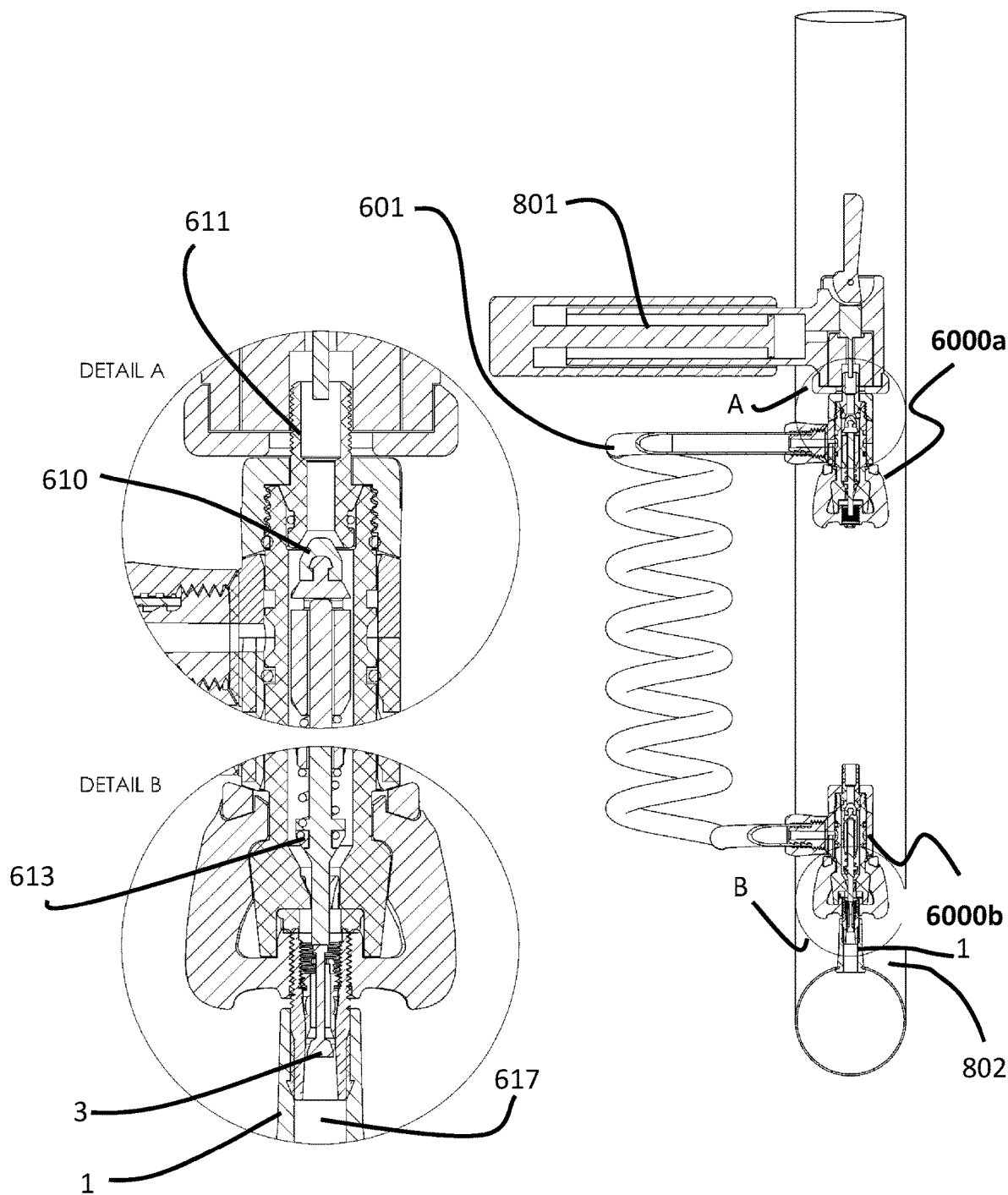
FIG. 10 shows a coiled flow tube connecting from a hand pump to a bicycle tire, in a connected position. The pump is in a work stroke position inducing air pressure into the device and tire tube.

Referring now to FIG. 10 showing a coiled flow tube 601 device linking to a hand pump 801 from one side and to a bicycle tire 802 on the other side, through valve 617. The pump 801 is in a work stroke position introducing air pressure into the device and tire tube. It is evident in details A and B that the shortened pin with valve 610 is depressed into open position in the male side of the hermetic connector due to positive air pressure being propelled from the pump 801. The bicycle valve stem 1 is connected to female valve connector on the device and as a result the valve core 3 is pressed open and valve 613 in the device is forced open. At this point the pump, the device, and the pneumatic tire tube are in full fluid communication propelling sealant into the pneumatic tire.

Figure 11:
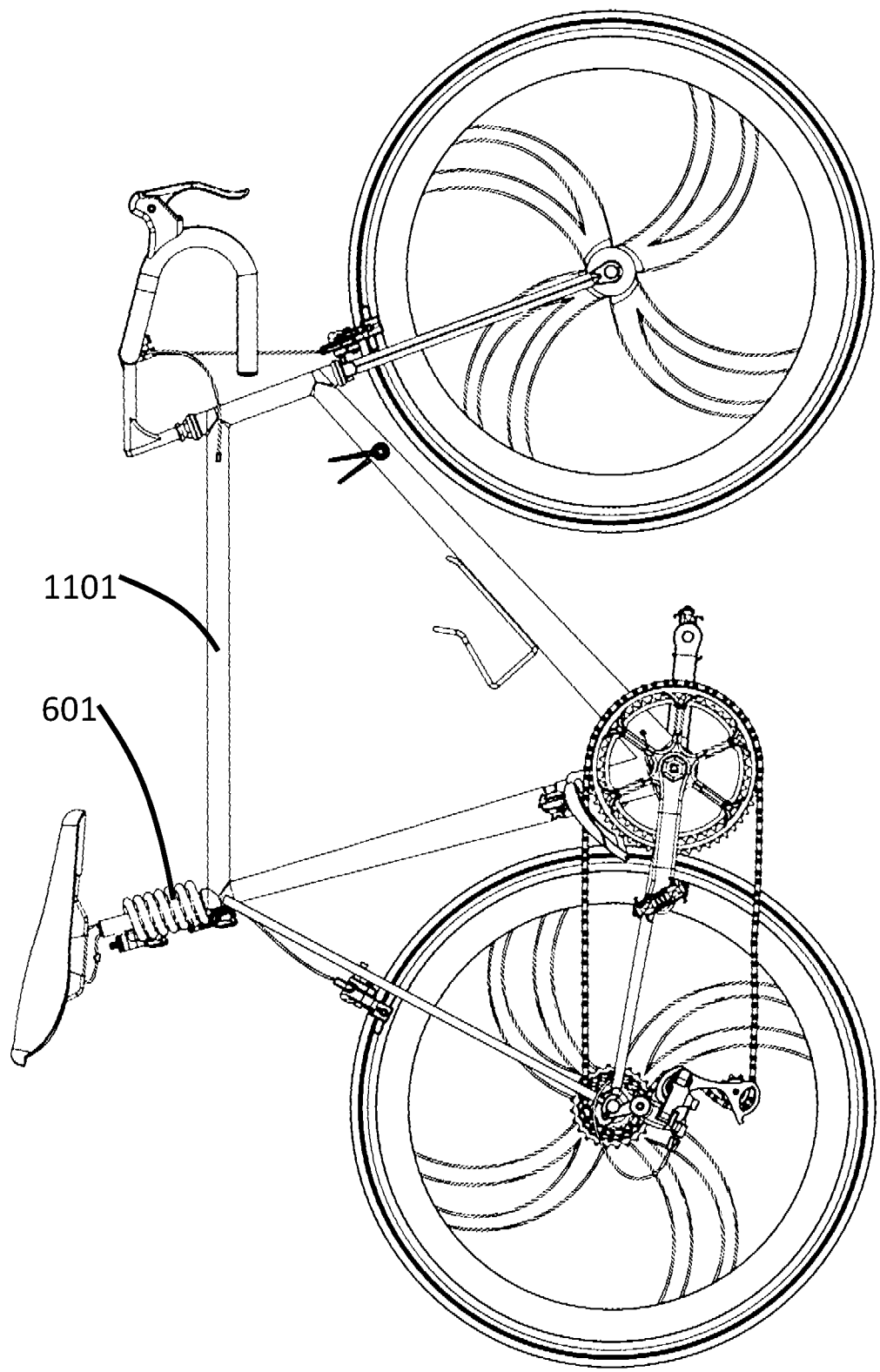
FIG. 11 shows a bicycle fitted with a coiled flow tube that has self-clamping properties.

Referring now to FIG. 11 showing a bicycle frame 1101 fitted with a coiled flow tube 601 that has self-clamping properties.

Figure 12:
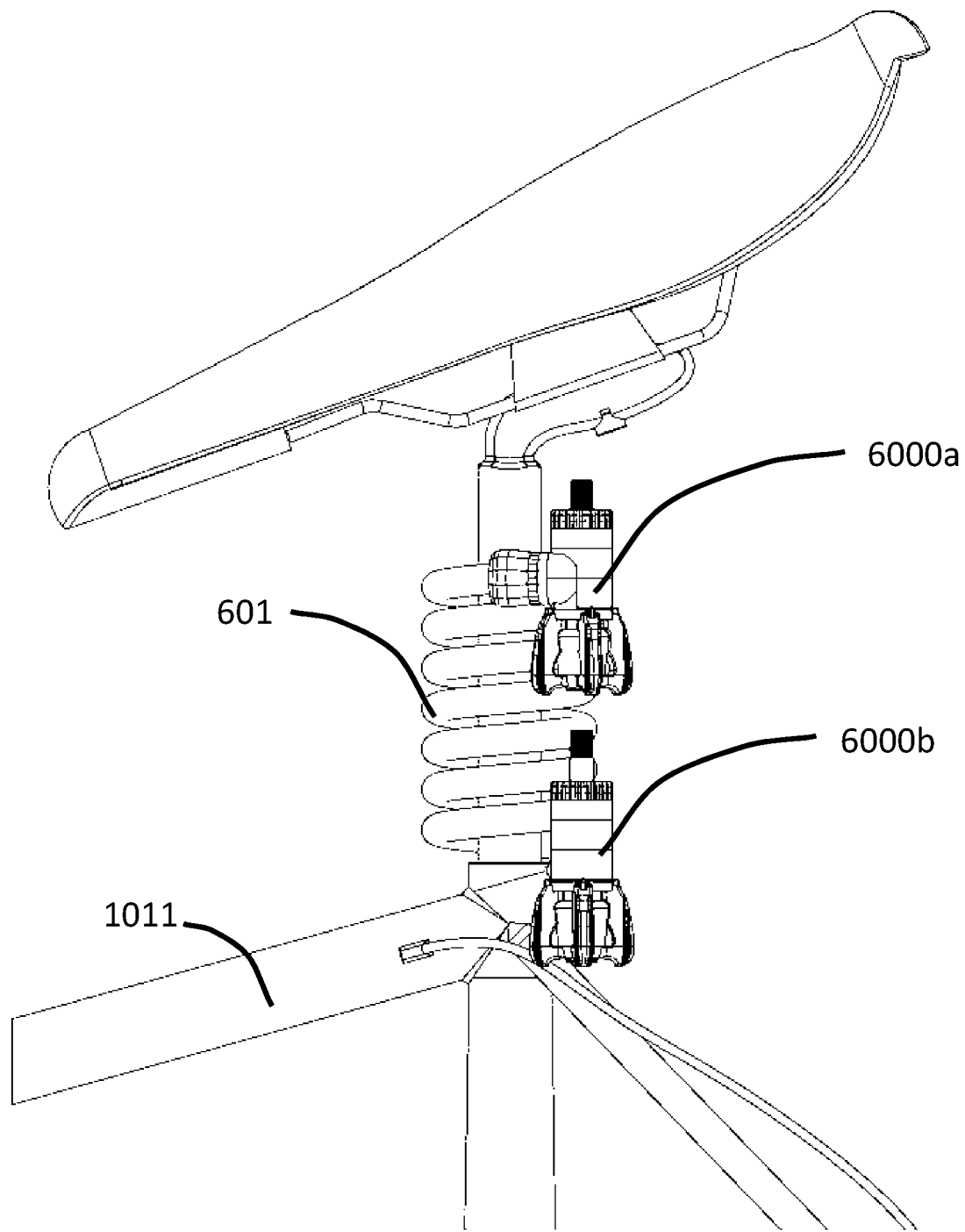
FIG. 12 shows a close-up of coiled flow tube on bike frame with flow tube hermetic connectors.

Referring now to FIG. 12 showing a close-up of coiled flow tube 601 on bike frame 1101 with flow tube hermetic connectors 6000a, 6000b.

Figure 13:
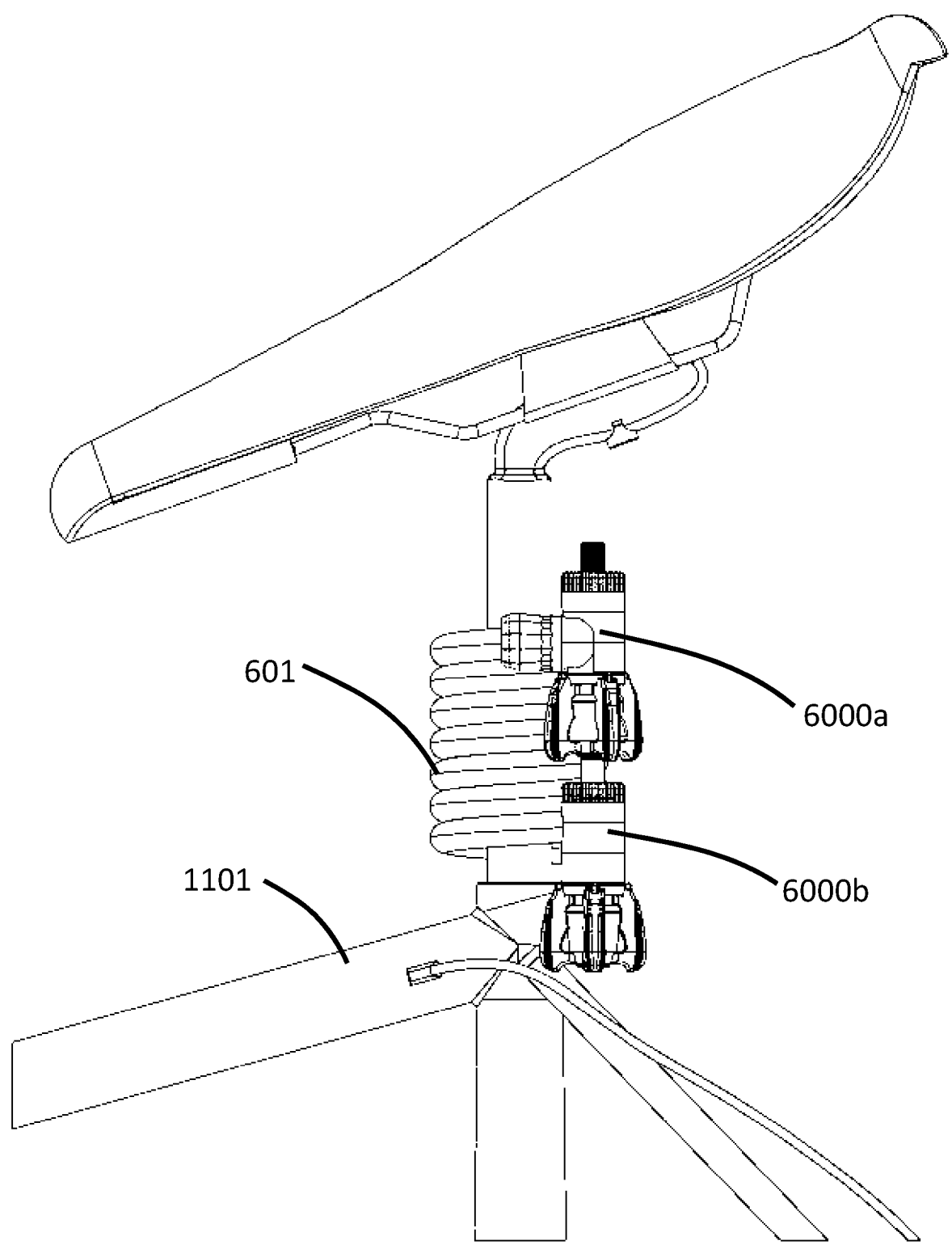
FIG. 13 shows a close-up of a coiled flow tube fastened by connecting the flow tube hermetic connectors one to another and by this making a secure connection of the device to the bicycle frame.

Referring now to FIG. 13 showing a close-up of a coiled flow tube 601 fastened by connecting the flow tube hermetic connectors 6000a, 6000b one to another making a secure connection of the device to the bicycle frame 1101, providing ease and security of transportation.

Figure 14:
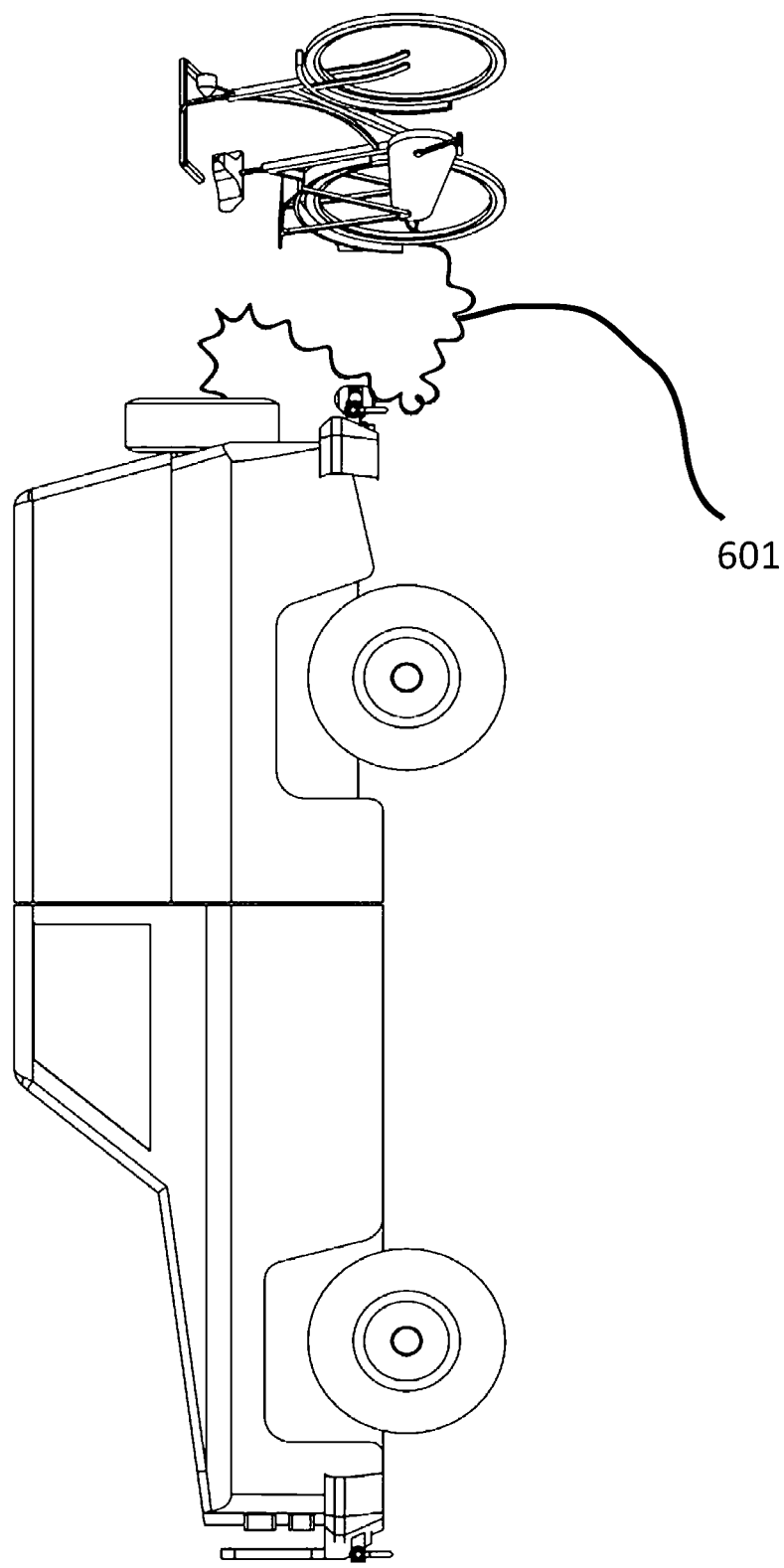
FIG. 14 shows a flow tube device being used for setting up a bicycle tubeless tire from a car spare tire.

Referring now to FIG. 14 showing a flow tube 601 used as described previously for setting up a tubeless bicycle tire receiving the needed air pressure and airflow rate needed from a spare car tire.

Figure 15:
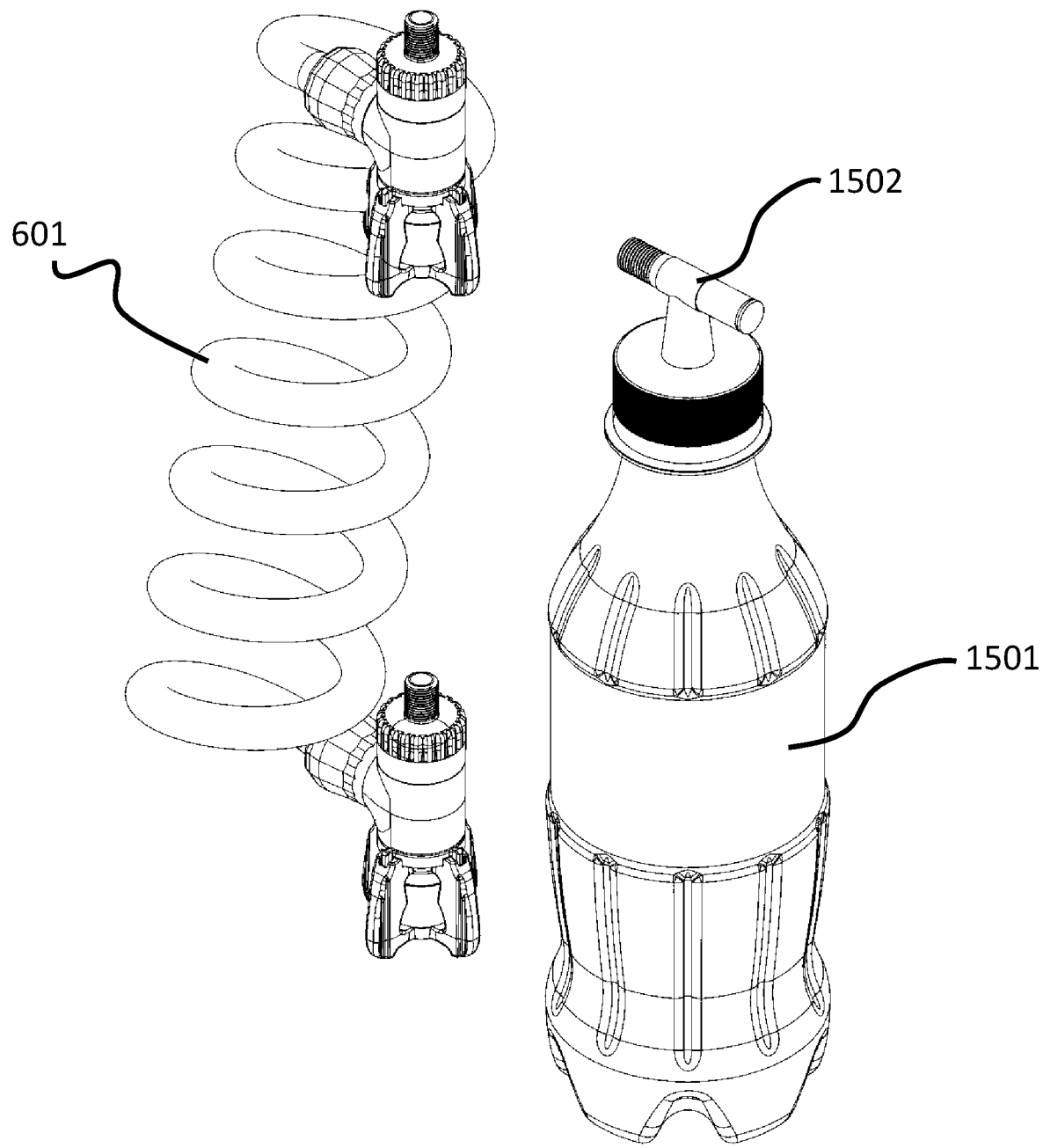
FIG. 15 shows a coiled flow tube with an alternative source of air pressure, a soft drink bottle fitted with a Schrader valve and a pressure limiter. They are one next to each other. This comes to show the versatility of application and air sources allowing for simple, eco-friendly easy-to-use tire repair solutions.

Referring now to FIG. 15 showing a coiled flow tube 601 with an alternative source of pressured air 1501. A soft drink bottle fitted with a Schrader valve and a pressure limiter 1502 filled with gas pressure. In the present figure, the device 601 and compressed air bottle 1501 are positioned one next to the other. This comes to show the versatility of application and pressured air sources allowing for simple, eco-friendly, refillable, easy-to-use tire repair and inflation solutions.

Figure 16:
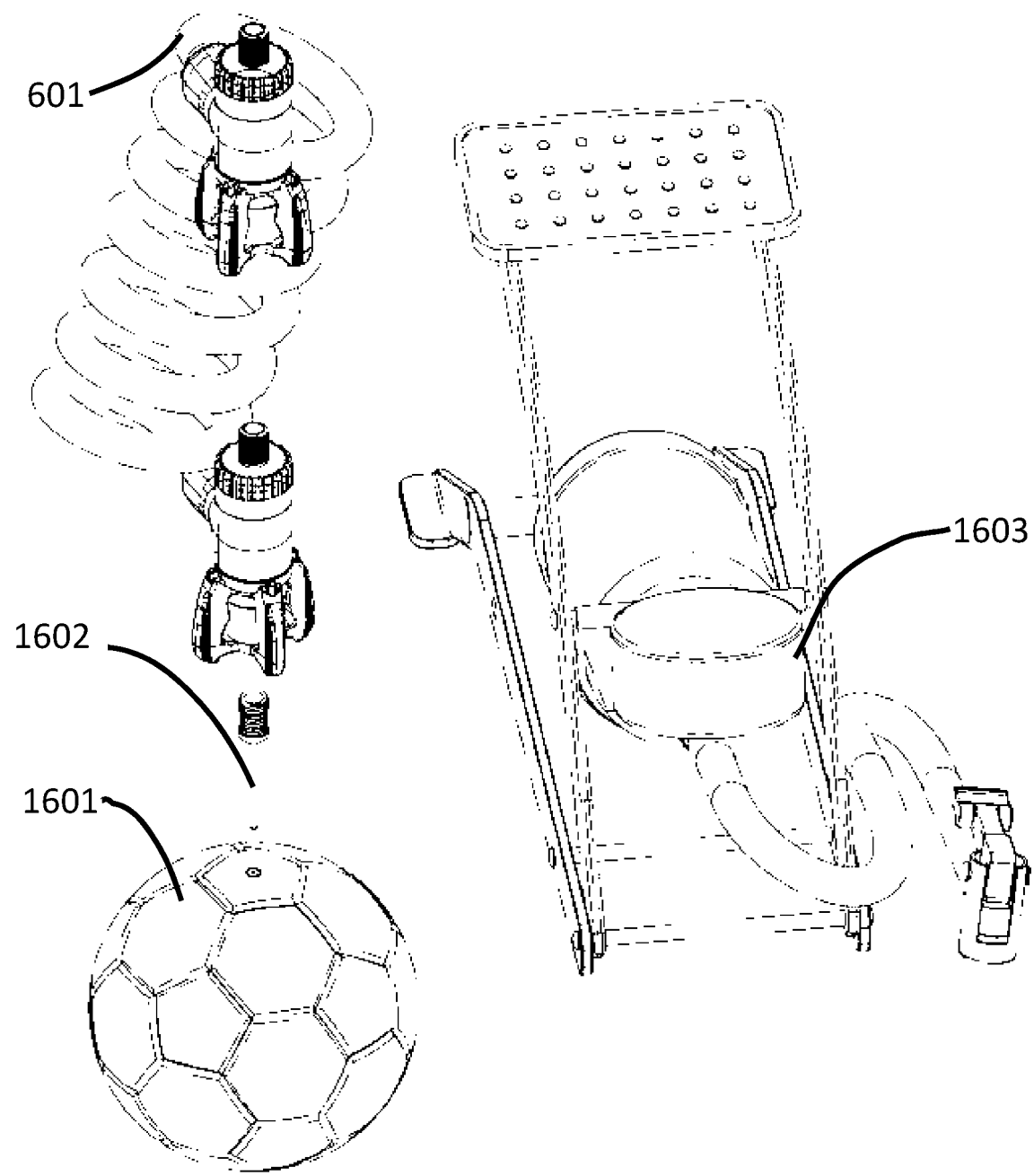
FIG. 16 shows another use for the present invention. A foot-pump is used to fix a soccer ball using the present invention connected to an inflating pin.

Referring now to FIG. 16 showing another use for the invention, the device 601 can be used to repair any inflatable object that needs sealing, repairing and inflation. In this example, the soccer ball 1601 can be repaired by connecting inflation pin 1602 to invention 801. Invention 601 can be attached to a regular ball foot-inflator 1603 in order to provide the necessary pressured-air.

Figure 17:
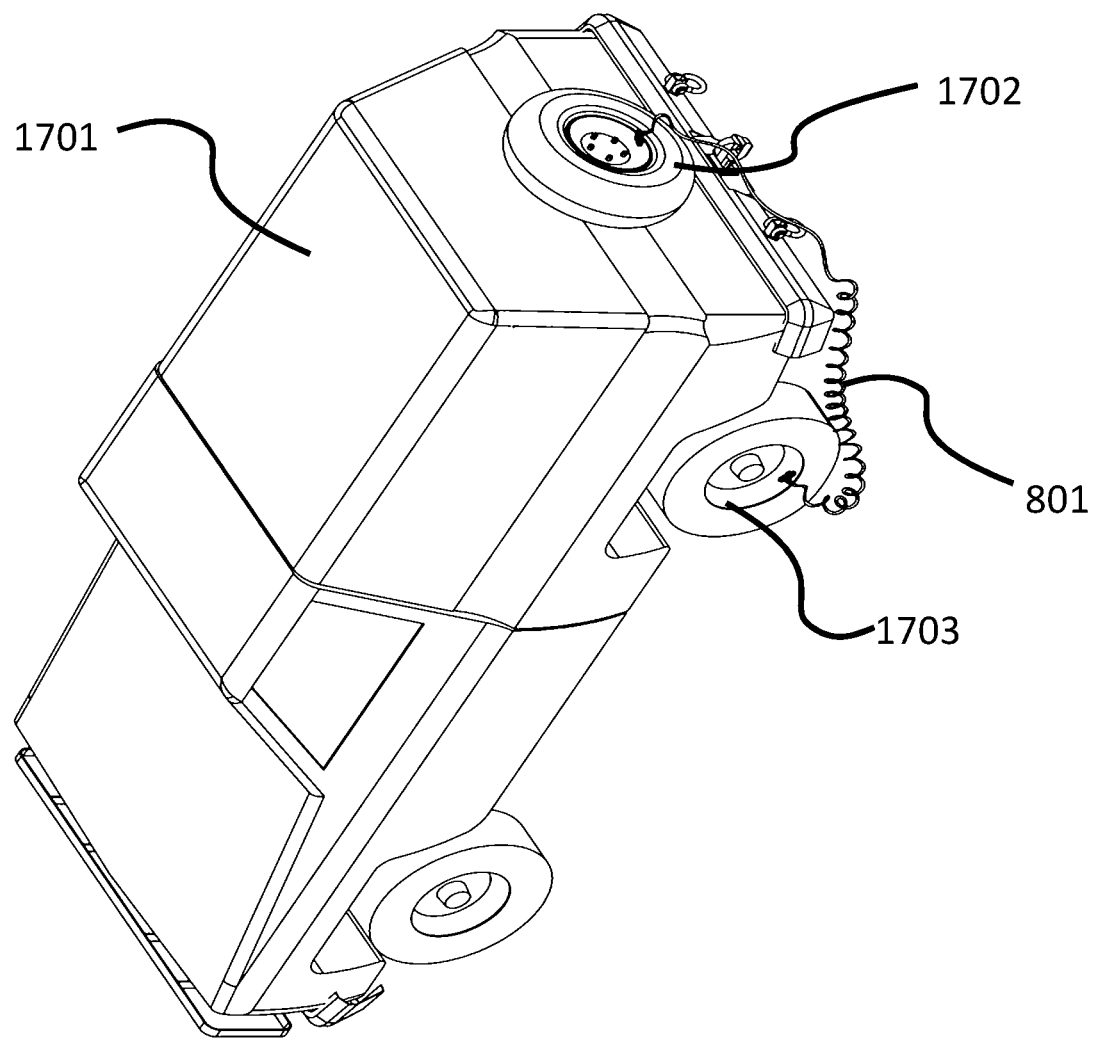
FIG. 17 shows a car spare tire that is used as an air pressure source, fixing a car flat tire through a coiled flow tube.

Referring now to FIG. 17 showing car 1701 in which the spare tire 1702 is used as an air pressure source, fixing a car flat tire 1703 through a coiled flow tube 601.

Figure 18:
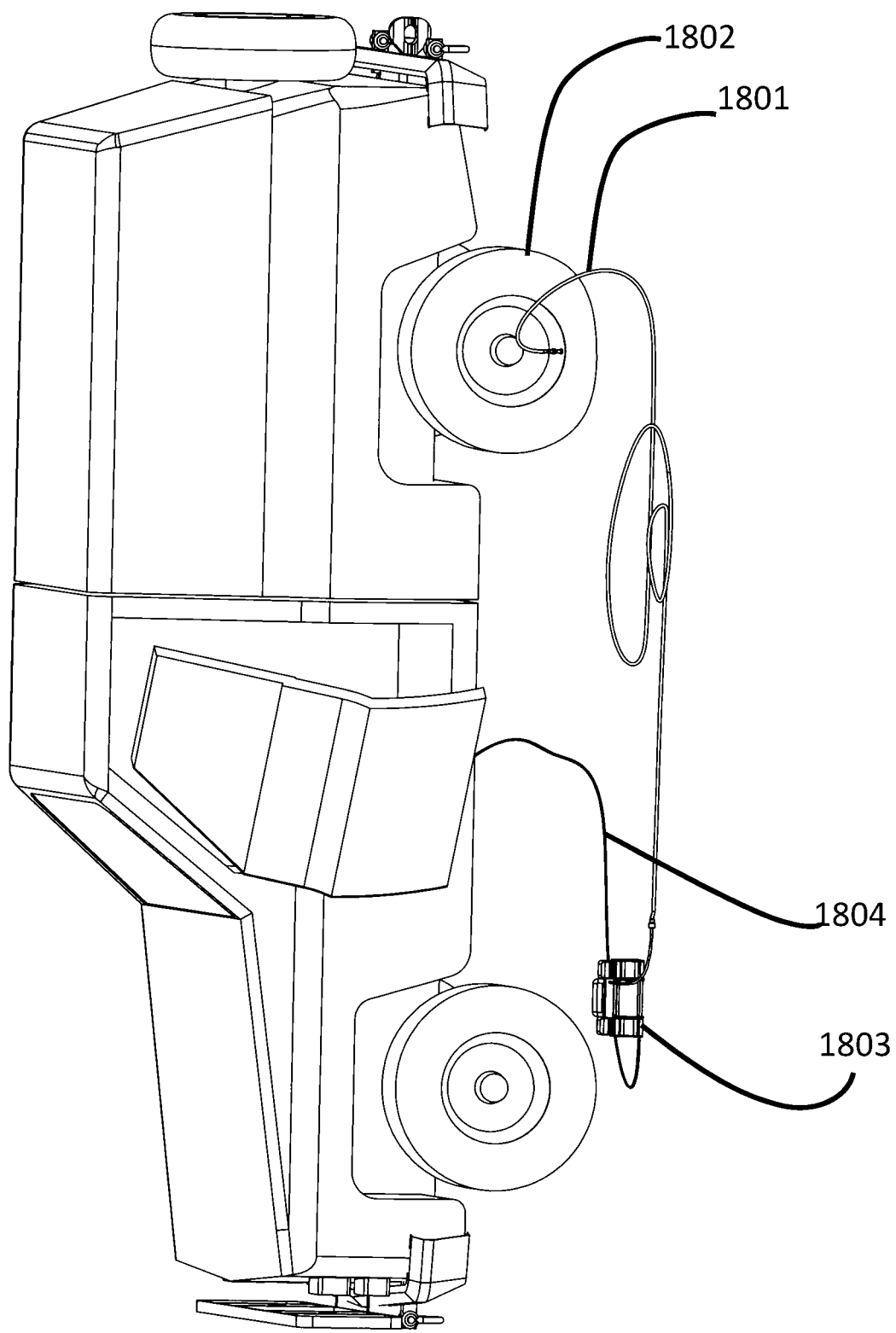
FIG. 18 shows a flat tire that is being repaired with another embodiment of the present invention. Instead of a short coiled tube, the sealant is stored in a long tube. The air pressure source in this case is a compressor attached to an electrical source of the same car.

Referring now to FIG. 18 showing another embodiment of the present invention. The tube containing the sealant is a long flexible tube 1801 (not coiled). In this case, since the tire 1802 requires a large amount of sealant, the long sealant-containing tube 1801 is more suitable. In addition, showing is a vehicle compressor 1803 that can be connected to a power source in the car 1804, like a lighter socket.

Figure 19:
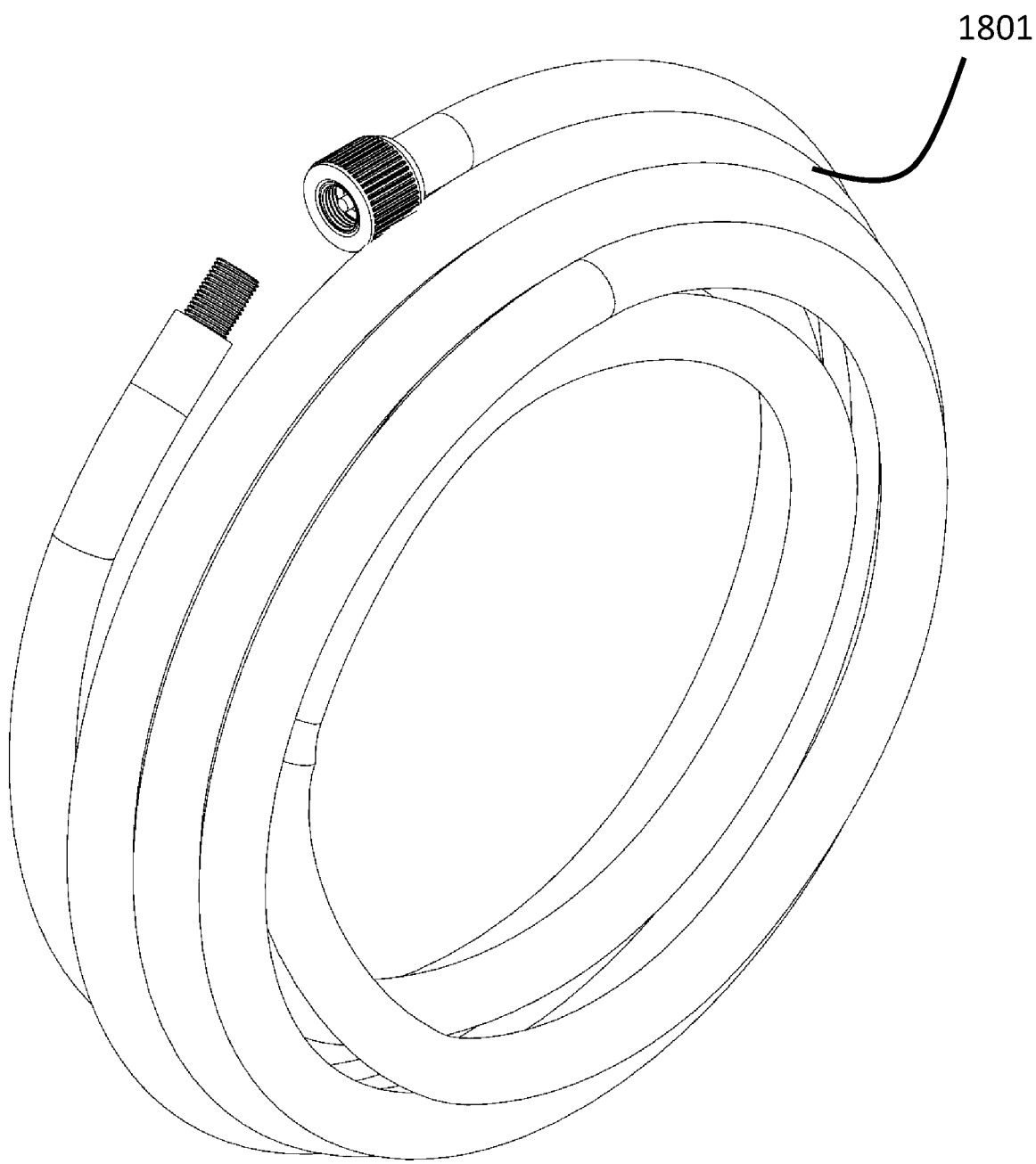
FIG. 19 shows a flow tube with two hermetic connectors, and a check valve in the male hermetic connector side. This embodiment that has only a single check valve in the male hermetic connector side can allow for insertion of highly reactive sealant slime sealing agents into the tire via the valve stem valve stem with the absence of valve core. This device is shown in use in FIG. 18.

Referring now to FIG. 19 showing a close-up of the long flexible tube 1801.

Figure 20:
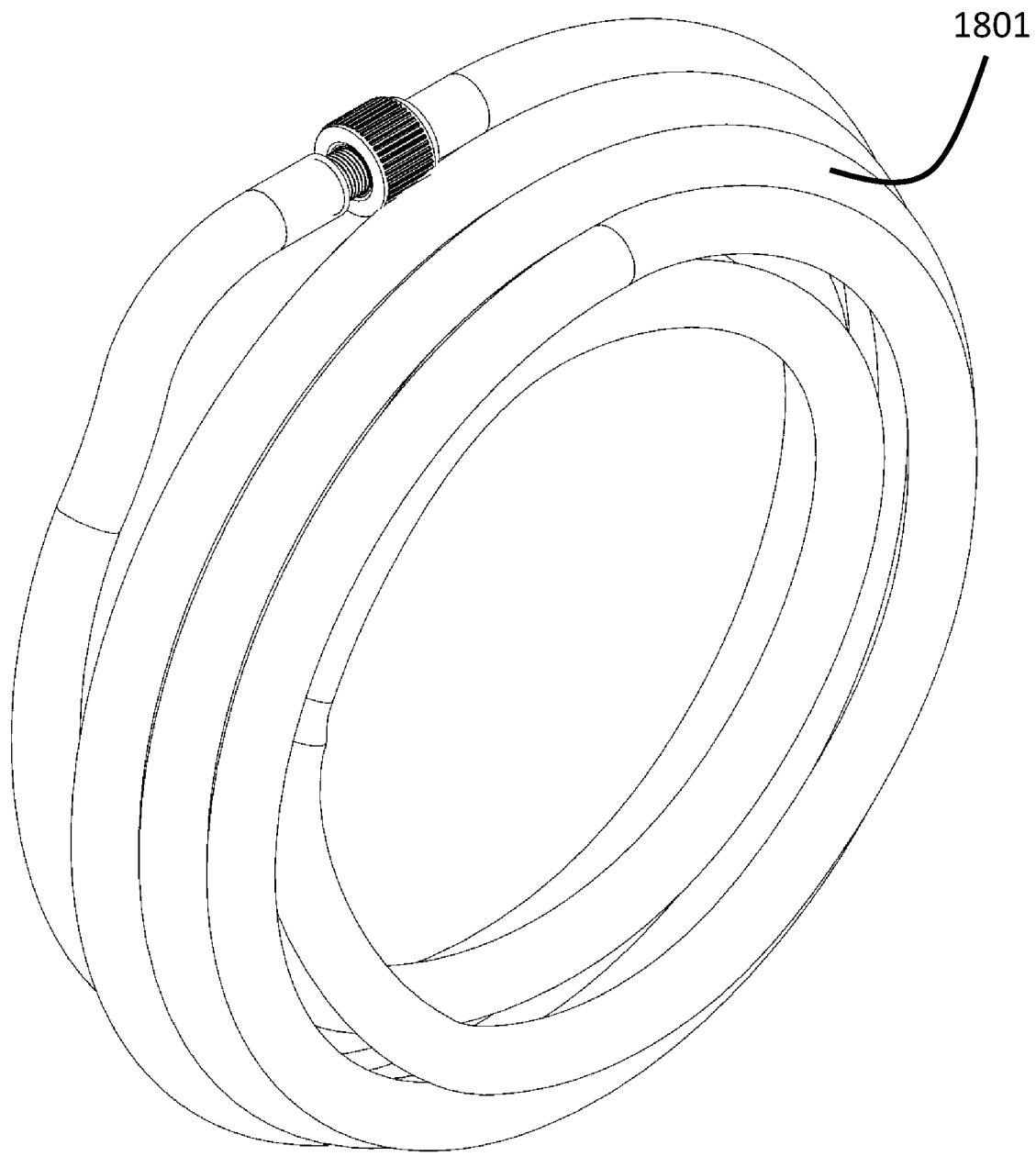
FIG. 20 shows how this embodiment is made portable, even though this embodiment is fitted with only one one-way valve. This is achieved by keeping the male and female hermetic connectors connected to one another until use of the device for repairing a flat tire.

Referring now to FIG. 20 showing a close-up of the long flexible tube 1801, fastened by connecting the flow tube hermetic connectors one to another making a secure connection of the device, providing ease and security of transportation.

Figure 21:
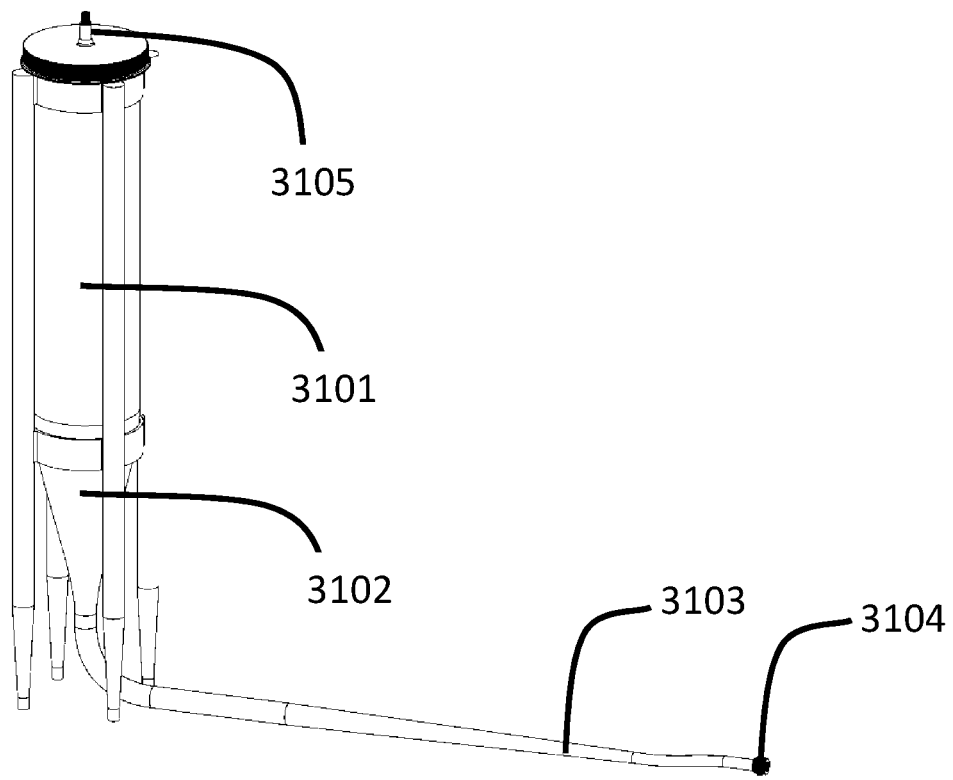
FIG. 21 shows a gradual Flow Tube embodiment using a large volume of sealant that is capable of filling a car tire or multiple bicycle tires with sealant with more comfort and ease.

Referring now to FIG. 21 showing a detailed view of a gradual Flow Tube. A hermetic connector with a near constant cross section 3104 coupled to an air-tight flow tube 3103 that is coupled to a funnel unit 3102 that links to a sealant slime canister 3101 that has a pneumatic connector 3105 for air pressure.

Figure 22:
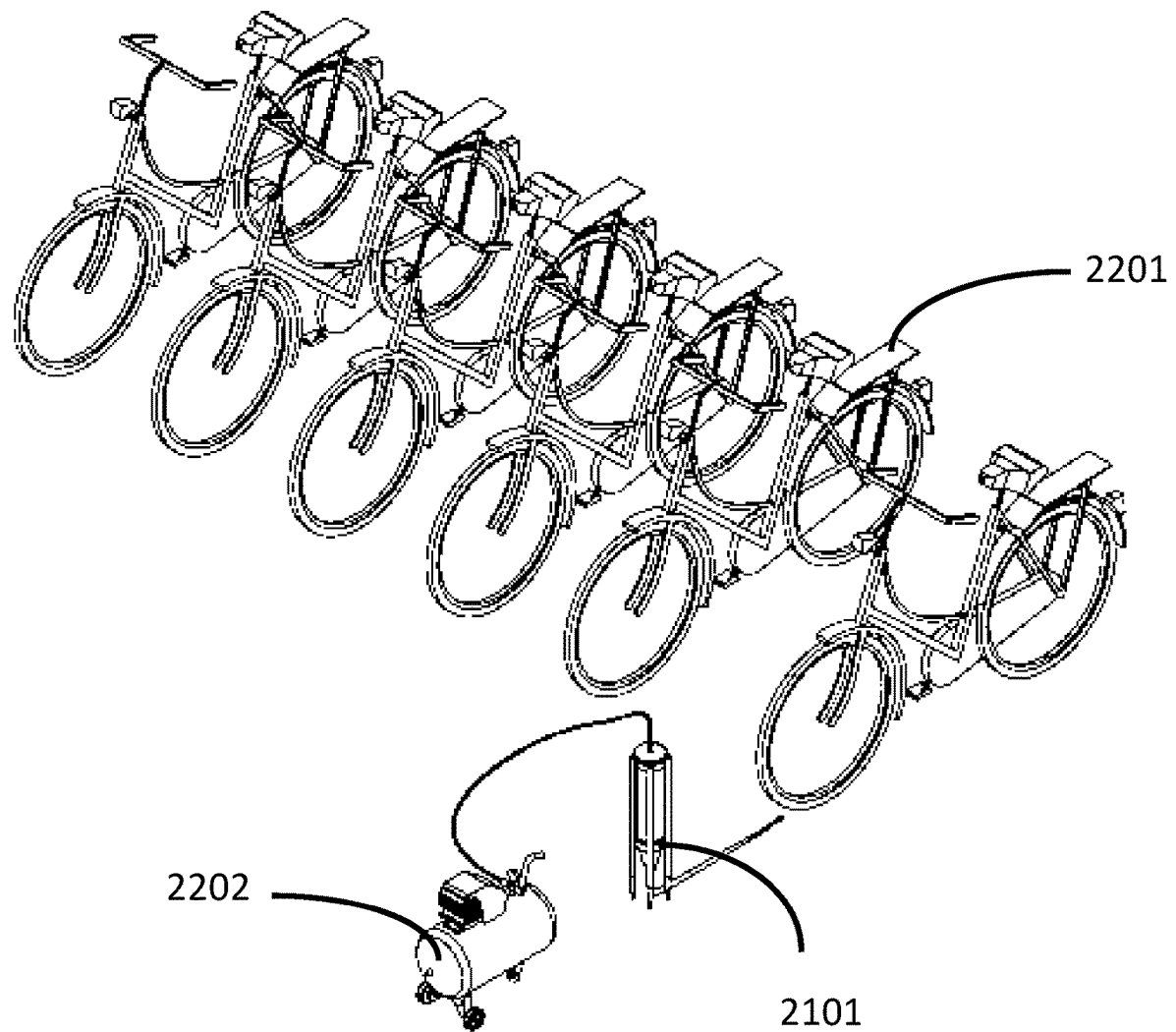
FIG. 22 shows the gradual Flow Tube in a bicycle workshop. The air source for this Flow Tube is an air compressor.

Referring now to FIG. 22 showing the gradual Flow Tube device 2101 in a bicycle workshop; set up to fill several bicycles 2201. The air source for this Flow Tube device is an air compressor 2202.

Figure 23:
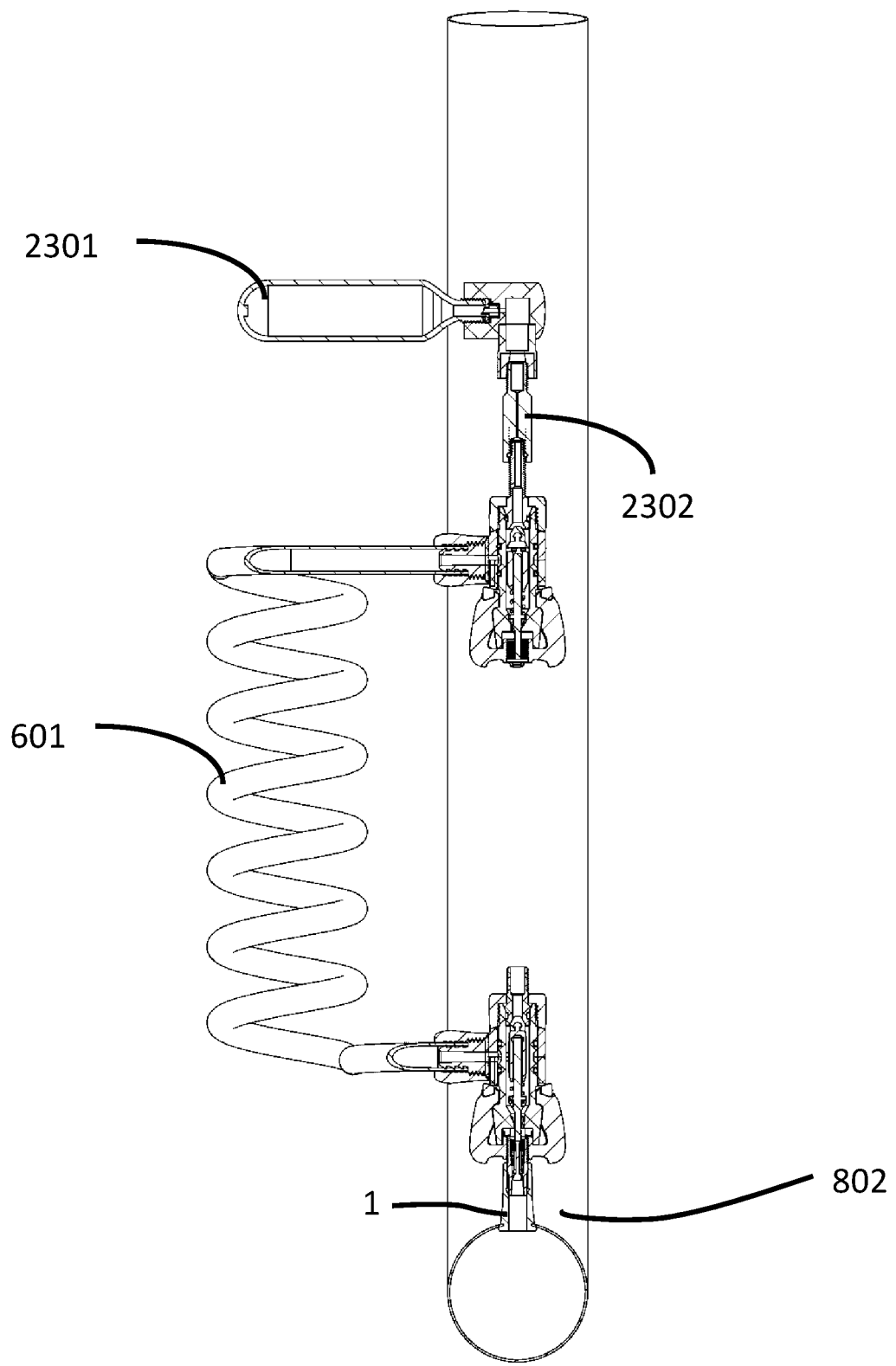
FIG. 23 shows a Flow Tube connected to a bicycle inner tube, utilizing a high-pressure $CO_2$ cartridge as the pressure source. This is done by linking a pressure limiter between the $CO_2$ cartridge and the Flow Tube.

Referring now to FIG. 23 showing a Flow Tube 601 connected to a bicycle tire 802, utilizing a high-pressure $CO_2$ cartridge 2301 as the pressured air source. This is done by linking a pressure limiter 2302 between the $CO_2$ cartridge 2301 and the Flow Tube 601. The pressure limiter 2302 has a tight passageway that may be 0.1-0.5 mm in diameter depending on the latex reactivity and length of the tight passageway. This produces sufficient pressure drop that prevents thermal and high pressure shocks from acting on the sealant, and by that prevents premature polymerization of the latex sealant.

Figure 24:
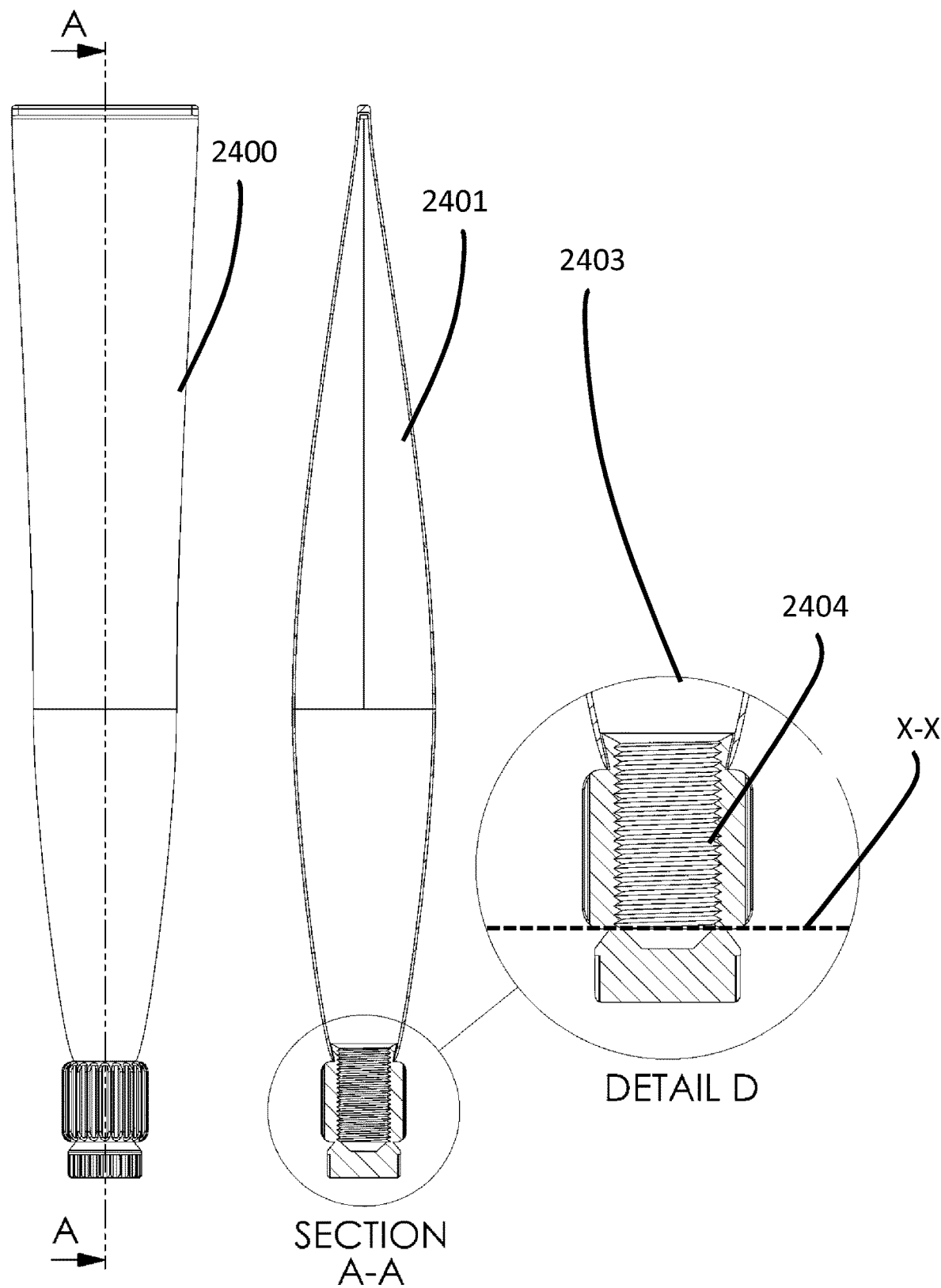
FIG. 24 shows two points of view of a toothpaste shaped Flow Tube. Presented in detail is a unique design of a hermetic valve connector which is constructed as a one piece injection, this gives the advantages of lowering manufacturing costs by using less materials, no moving parts or discrete seals.

Referring now to FIG. 24 showing another embodiment of the present invention. Two points of view of a toothpaste shaped Flow Tube (2400 and 2401). Presented in Detail D is a unique design of a hermetic valve connector 2403, which, an important feature of the embodiment, is the fact that it is constructed as a one-piece injection. This gives the advantages of lowering manufacturing costs by using less materials, no moving parts for clamping, nor does this embodiment require a seal as a secure and sealed connection is achieved between the plastic threads 2404 and a pneumatic tire valve (not shown). Toothpaste flow tube 2400 is presented as a front view. 2401 is a side view—cross section A-A of the toothpaste Flow Tube 2400. Detail D gives a viewpoint of the one-piece hermetic valve connector 2403, which achieves a secure seal through its tight threads and with no moving parts. This embodiment is a one-time use tube. Once sealing is needed, the top part is cut along the imaginary line X-X. In another embodiment, this top part is configured as an easy opening mechanism.

Figure 25:
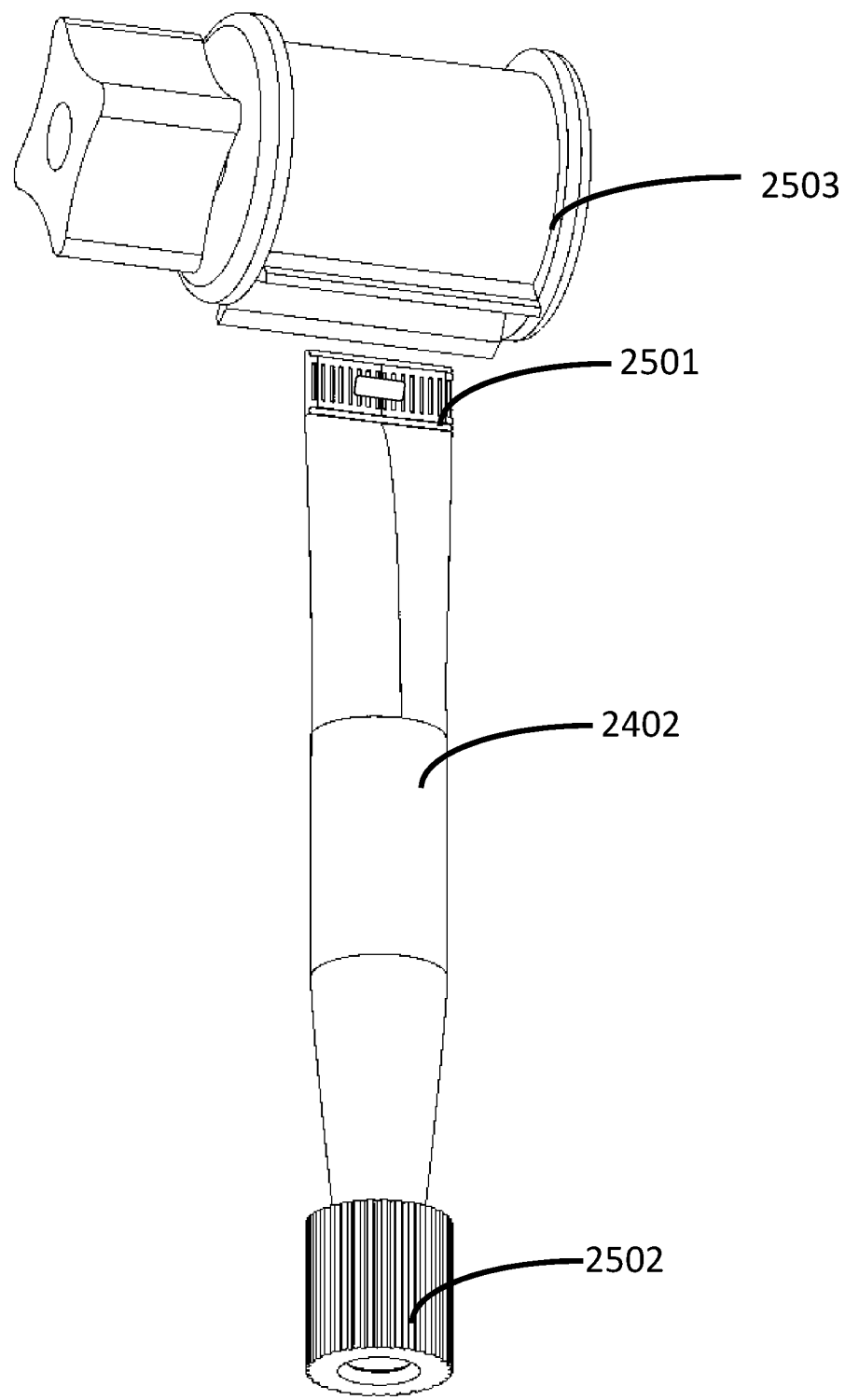
FIG. 25 shows a toothpaste like flow tube, with one end sealed closed and having no valves, one hermetic connector, and an optional mechanical squeezer. This embodiment is suited for inserting slime, with the quantity fit to size for simplicity of use.

Referring now to FIG. 25, showing gradual Flow Tube toothpaste tube shaped 2402, with one closed sealed end 2501 and having a hermetic connector 2502, and an optional mechanical squeezer 2503 for ease of application. This embodiment is ideal for packaging of sealants, especially Sealant Slime. This embodiment provides ease of application with no spillage via the hermetic connector 2502. This embodiment will also provide a direct and simple means for application of Sealant Slime into pneumatic tires without the need to remove the valve core. This embodiment, as the others, will provide the dose needed for the tire, eliminating the user from having the need to make rough calculation about the amount of sealant needed, or making estimations about the amount of sealant that has entered the tire.

Figure 26:
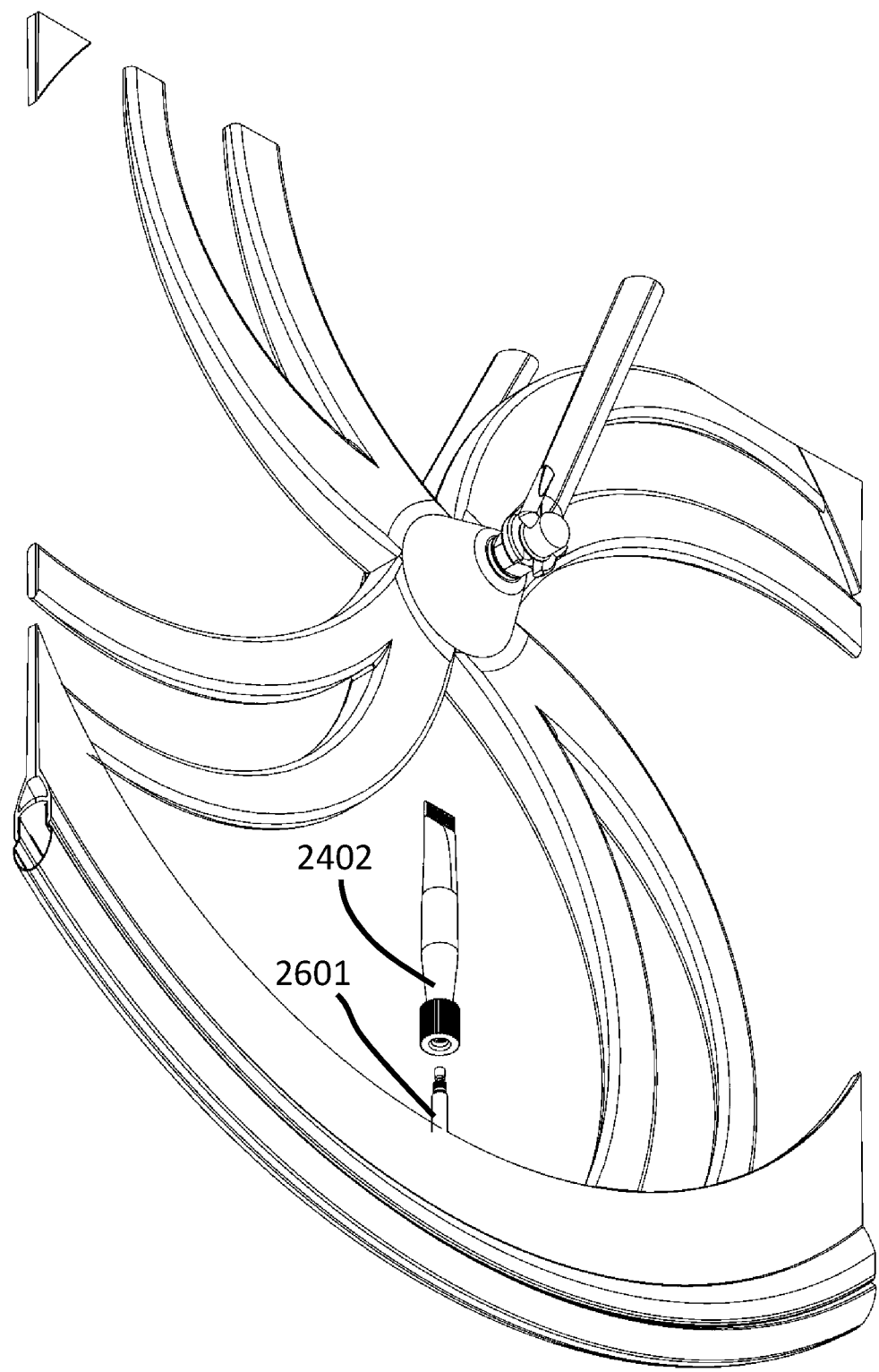
FIG. 26 shows the toothpaste flow tube before connection to a bicycle wheel valve.

FIG. 26 shows the toothpaste flow tube 2402 before connection to bicycle wheel valve 2601.

Figure 27:
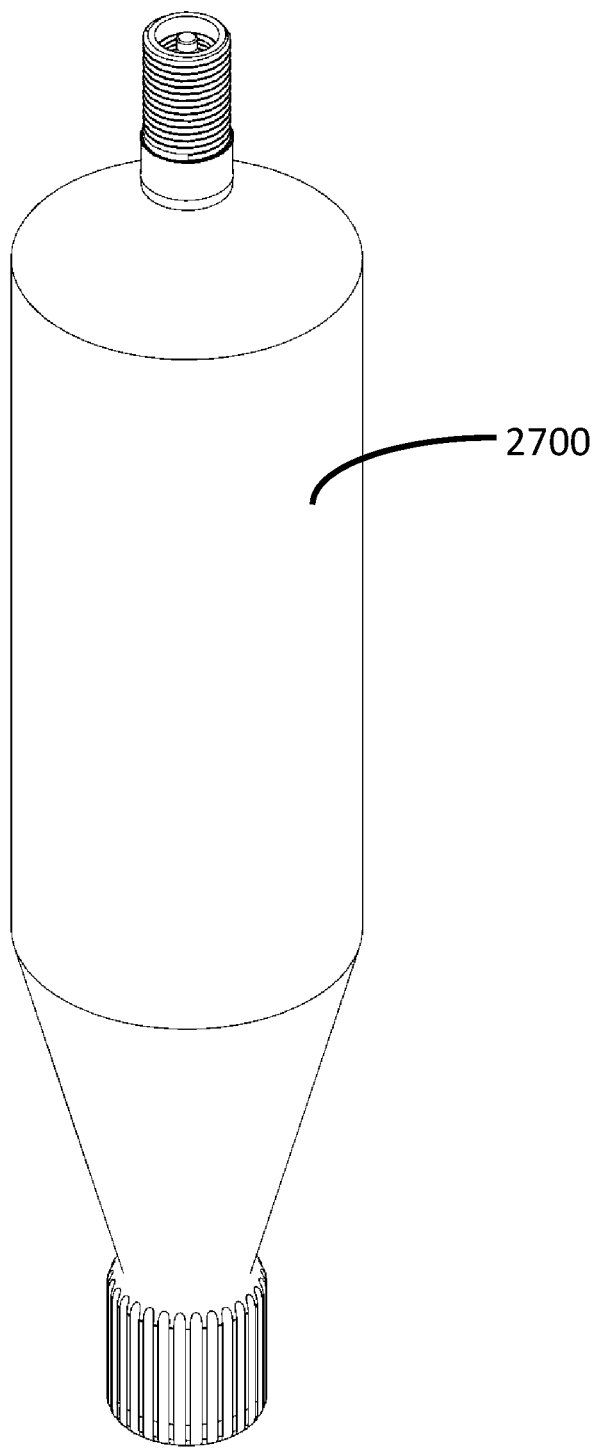
FIG. 27 shows another embodiment of the present invention. Wide toothpaste shaped Flow Tube adapted to contain more sealant agent in a more compact form. This wide flow tube can be used with sealants, which are thinner then Sealant Slime or which are less prone to premature polymerization when passing through the valve mechanism.

Referring now to FIG. 27, showing another embodiment of the present invention. The flow tube 2700 containing the sealant is wider than the rest of the flow tubes shown in other embodiments in this document. This wider Flow tube can be used when applying sealants that are thinner than Sealant Slime or which are less prone to premature polymerization when passing through the valve mechanism, such as recent sealant technology developed. The wide flow tube may offer a better option for large sealant quantities as it will shorten the overall length of the Flow Tube, and possibly provide a more compact device. This utilizes two hermetic connectors and two one-way valves, which produce a concealed cavity for the sealant to be easily transported. This embodiment provides the pneumatic tire user a portable, efficient, cheap, lightweight sealant transfer and tire inflation solution.

It is within provision of the device to use a one-way valve within connectors at one or both ends of the flow-tube that is designed to mate with "Presta" and "Schrader", "Dunlop" or any other type valve.

It is provision of the device that the invention can be configured in such a way that it will function correctly as long as the pressure received is from a source containing more than (>) 24 psi. This is important in cases the source of the pressured air is the spare tire of the car.

The foregoing description and illustrations of the embodiments of the invention have been presented for the purpose& of illustration. It is not intended to be exhaustive or to limit the invention to the above description in any form, but rather to the contrary, the figures and embodiments come to show the diversity of the invention and it's different possible embodiments.

It is provision of the device that the tube can have a straight or coiled configuration. The coiled configuration provides a better way to store the device, as shown previously in FIGS. 12 and 13. In either configuration, the total container area of the sealant enabled by the length of the tube together with the internal area created by the diameter of the tube is always enough for the specific item that needs to be fixed. It is logical that less sealant is needed in order to fix a bicycle wheel than a car tire. In each case, a specific combination of length of the tube and diameter of the tube will be calculated upon required volume of sealant slime, external constraints, and fiber content of the sealant slime.

It is provision of the device that the uniquely designed depressing pin 615 which is structured in length (between 2.2-3.5 mm) is configured to press and open a pneumatic tire valve pin more than any regular inflator. The further opening of said valve pin enables better linear flow of the sealant, avoiding early polymerization and causing the valve to be stuck. The principal design will aim at achieving the maximum opening of the valve possible.

Most of the embodiments of this invention are made of reusable, lightweight, replaceable, recyclable, refillable, serviceable components which will guarantee long-lasting products, cost-efficiency, and will provide the all-round eco-friendly solution that bicycle riders and other pneumatic tire users around the world are yearning for. In most embodiments, there is no need to throw away the device after a single use, just refill the device repeatedly for a safe sealant insertion.

This invention comes as a direct opposition to the planned obsolete approach, which has badly infected all of our industries and as a result has taken a great toll on our environment. No need for wasteful pressurized cans, or tire repairs that only last for a few hours of use.

The reference numbers in the claims are not a part of the claims, but rather used for facilitating the reading thereof. These reference numbers should not be interpreted as limiting the claims in any form.

In the preceding detailed description, numerous specific details are set forth in order to provide a thorough understanding of embodiments of the present invention. However, those skilled in the art will understand that such embodiments may be practiced without these specific details. Furthermore just as every particular reference may embody particular methods, systems, yet not require such, ultimately such teaching is meant for all expressions notwithstanding the use of particular embodiments. Reference throughout this specification to "one embodiment" or "an embodiment" means that a particular feature, structure, or characteristic described in connection with the embodiment is included in at least one embodiment of the invention.

Any term that has been defined above and used in the claims, should be interpreted according to this definition.

The invention claimed is:

1. A device for inflating and sealing a pneumatic tire, said pneumatic tire having an inflation valve, comprising:
   a. an air-tight tube having a first end, a second end and an internal space defined by walls of said air-tight tube;
   b. a male valve stem connector coupled to said first end of said air-tight tube and connectable to a source of pressure;
   c. a female valve connector coupled to said second end of said air-tight tube connectable to said inflation valve of said pneumatic tire, said female valve connector comprises a depression pin;
   d. a volume of Sealant Slime sealing agent contained within said internal space of said air-tight tube; said Sealant Slime sealing agent comprises fibers;
   wherein said internal space of said air-tight tube defines a pathway for a flow of said volume of Sealant Slime sealing agent from said male valve stem connector through said air-tight tube to said female valve connector;
   wherein said depression pin is configured to press and open said inflation valve for about 2 mm to 3.5 mm;
   wherein said internal space and said female connector have a near constant flow area cross section that avoids sharp edges which would cause separation or which interfere with alignment of said fibers within said flow in said Sealant Slime sealing agent at said pressure;
   wherein said pneumatic tire is sealed and inflated successively without removal of said valve core of said pneumatic tire.

2. The device of claim 1, wherein said air-tight tube is coiled into a helical coil with an inner circumference suitable for wrapping around an object.

3. The device of claim 1, further comprising a canister of compressed gas adapted to charge said inflatable object with said compressed gas by means of said device.

4. The device of claim 1, wherein said male valve stem and said female valve connector comprise check valves, thereby maintaining a hermetically sealed cavity for said Sealant Slime sealing agent when said device is transported.

5. The device of claim 1, wherein said depressing pin opens a valve core of said inflation valve to the maximum length enabled by the manufacture of said inflation valve.

6. The device of claim 1, wherein said device further comprises a pressure-limiting element for linking between said male valve stem connector and said source of pressure thereby limiting the pressure.

7. The device of claim 1, wherein said Sealant Slime sealing agent is kept inside said device due to the interconnection of said male valve stem connector and said female valve connector.

8. The device of claim 1, further comprising:
   a. a sealant canister (3101) with a pneumatic connector (3105);
   b. a volume of Sealant Slime sealing agent contained within said sealant canister;
   c. a funnel unit (3102) connected on a wide side to said sealant canister and on a narrow side to said male valve stem connector;
   d. a source of pressure connected to said sealant canister pneumatic connector.

* * * * *